(12) United States Patent
Zhang et al.

(10) Patent No.: US 11,783,619 B2
(45) Date of Patent: Oct. 10, 2023

(54) FINGERPRINT IDENTIFICATION APPARATUS AND ELECTRONIC DEVICE

(71) Applicant: SHENZHEN GOODIX TECHNOLOGY CO., LTD., Shenzhen (CN)

(72) Inventors: Sichao Zhang, Shenzhen (CN); Yin Wang, Shenzhen (CN); Junxian Lin, Shenzhen (CN); Fei Hsin Tsai, Shenzhen (CN)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 134 days.

(21) Appl. No.: 17/512,320

(22) Filed: Oct. 27, 2021

(65) Prior Publication Data

US 2022/0050994 A1 Feb. 17, 2022

Related U.S. Application Data

(63) Continuation of application No. PCT/CN2020/104589, filed on Jul. 24, 2020.

(51) Int. Cl.
*G06K 9/00* (2022.01)
*G06K 9/20* (2006.01)
(Continued)

(52) U.S. Cl.
CPC .......... *G06V 40/1318* (2022.01); *G02B 5/005* (2013.01); *G06V 10/147* (2022.01); *G02B 3/0056* (2013.01); *G02B 5/208* (2013.01)

(58) Field of Classification Search
CPC .. G06V 40/1318; G06V 10/147; G02B 5/005; G02B 3/0056; G02B 5/208
See application file for complete search history.

(56) References Cited

U.S. PATENT DOCUMENTS

| 10,181,070 B2 | 1/2019 | Smith |
|---|---|---|
| 10,613,256 B2 | 4/2020 | Lin |
| (Continued) | | |

FOREIGN PATENT DOCUMENTS

| CN | 106886767 A | 6/2017 |
|---|---|---|
| CN | 109389023 A | 2/2019 |
| (Continued) | | |

OTHER PUBLICATIONS

Translation of CN 110473887 A (Year: 2019).*

*Primary Examiner* — Lixi C Simpson

(57) ABSTRACT

A fingerprint identification apparatus and an electronic device are provided, which can improve the fingerprint imaging quality while achieving the lightness and thinness of the fingerprint identification apparatus. The fingerprint identification apparatus is applicable to be under a display screen, including a plurality of fingerprint identification units arranged in an array, where each fingerprint identification unit includes: a micro-lens; at least one light shielding layer, where each light shielding layer is provided with a light passing hole, a bottom light shielding layer is provided with N light passing hole, and a largest aperture $D_1$ of each light passing hole and a largest aperture CA of the micro-lens satisfy $0.02 \leq D_1/CA \leq 0.4$, to form N light guiding passages in different directions; N pixel units, disposed under the at least one light shielding layer, and disposed in one-to-one correspondence with bottoms of N light guiding passages.

20 Claims, 16 Drawing Sheets

(51) Int. Cl.
*G02B 5/00* (2006.01)
*G06V 40/13* (2022.01)
*G06V 10/147* (2022.01)
*G02B 3/00* (2006.01)
*G02B 5/20* (2006.01)

(56) References Cited

U.S. PATENT DOCUMENTS

| | | |
|---|---|---|
| 2017/0017824 A1 | 1/2017 | Smith |
| 2019/0049631 A1 | 2/2019 | Lin |
| 2019/0303640 A1 | 10/2019 | Song |
| 2020/0081163 A1 | 3/2020 | Lin |
| 2020/0226342 A1 | 7/2020 | Lin |
| 2020/0285345 A1* | 9/2020 | Xiang .................. G06F 3/0421 |
| 2021/0133423 A1 | 5/2021 | Zhang et al. |
| 2023/0134765 A1* | 5/2023 | Noudo ............... G06V 40/1388 382/124 |

FOREIGN PATENT DOCUMENTS

| | | | |
|---|---|---|---|
| CN | 110188702 A | 8/2019 | |
| CN | 110473887 A * | 11/2019 | ....... H01L 27/14621 |
| CN | 110674798 A | 1/2020 | |
| CN | 111095285 A | 5/2020 | |
| CN | 111095286 A | 5/2020 | |
| CN | 111133446 A | 5/2020 | |
| CN | 111213080 A | 5/2020 | |
| CN | 111328398 A | 6/2020 | |
| CN | 111435213 A | 7/2020 | |
| EP | 2506304 A3 | 10/2012 | |
| JP | 2020035327 A | 3/2020 | |
| WO | 2018064563 A1 | 4/2018 | |

* cited by examiner

330

| 1 | 2 | 1 | 2 | 1 | 2 | 1 | 2 |
|---|---|---|---|---|---|---|---|
| 3 | 4 | 3 | 4 | 3 | 4 | 3 | 4 |
| 1 | 2 | 1 | 2 | 1 | 2 | 1 | 2 |
| 3 | 4 | 3 | 4 | 3 | 4 | 3 | 4 |
| 1 | 2 | 1 | 2 | 1 | 2 | 1 | 2 |
| 3 | 4 | 3 | 4 | 3 | 4 | 3 | 4 |
| 1 | 2 | 1 | 2 | 1 | 2 | 1 | 2 |
| 3 | 4 | 3 | 4 | 3 | 4 | 3 | 4 |

FIG. 10

FINGERPRINT IDENTIFICATION APPARATUS AND ELECTRONIC DEVICE

CROSS-REFERENCE TO RELATED APPLICATIONS

This application is a continuation of International Application No. PCT/CN2020/104589, filed on Jul. 24, 2020, the disclosure of which is hereby incorporated by reference in its entirety.

TECHNICAL FIELD

The present application relates to the field of optical fingerprint technologies, and in particular, to a fingerprint identification apparatus and an electronic device.

BACKGROUND

Due to the increasing miniaturization of handheld electronic products in the future, the size of the current lens-based under-screen optical fingerprint products is difficult to adapt to this trend, and there is an urgent need to develop in the direction of thinner thickness, smaller volume, and higher integration. However, in a current miniaturization solution, the contrast of an image formed by collimation holes is related to the depth of the collimation holes, and a relatively large depth is required so that higher imaging quality can be achieved, besides, the light utilization rate of the present solution is low. A solution of using micro-lens to focus is limited by the process and a shape of a surface of the lens, although the light utilization rate is high, the signal is easily confused, resulting in low signal contrast and low fingerprint imaging quality.

Therefore, how to improve the quality of fingerprint imaging while achieving the lightness and thinness of the optical fingerprint identification apparatus is a technical problem to be solved urgently.

SUMMARY

Embodiments of the present application are provided with a fingerprint identification apparatus and an electronic device, which can improve the fingerprint imaging quality while achieving the lightness and thinness of the fingerprint identification apparatus.

In a first aspect, a fingerprint identification apparatus is provided, applicable to be under a display screen to implement under-screen optical fingerprint identification. The fingerprint identification apparatus includes a plurality of fingerprint identification units arranged in an array, and each fingerprint identification unit of the plurality of fingerprint identification units includes: a micro-lens; at least one light shielding layer, each light shielding layer of the at least one light shielding layer provided with light passing holes, and a bottom light shielding layer of the at least one light shielding layer provided with N light passing holes, where a largest aperture $D_1$ of each light passing hole of the bottom light shielding layer and a largest aperture CA of the micro-lens satisfy $0.02 \leq D_1/CA \leq 0.4$, to form N light guiding passages in different directions, and N is a positive integer greater than 1; N pixel units, disposed under the at least one light shielding layer, and the N pixel units disposed at bottom of the N light guiding passages in one-to-one correspondence; where after fingerprint light signals reflected or scattered by a finger above the display screen are converged by the micro-lens, N target fingerprint light signals in different directions are transmitted to the N pixel units through the N light guiding passages respectively, and the N target fingerprint light signals are configured to detect fingerprint information of the finger for fingerprint identification.

In embodiments of the present application, one micro-lens in the fingerprint identification apparatus corresponds to N pixel units, which can increase the amount of light entering the fingerprint identification apparatus, reduce the time of exposure, and increase the field of view. In the meantime, an imaging optical path formed by a single micro-lens matching with a multi-pixel unit can perform non-vertical light imaging on an object-side light beam of the fingerprint (that is, tilted light imaging), which can improve identification effect of dry fingers and expand an object-side numerical aperture of an optical system, reduce a thickness of an optical path design of the pixel array, and ultimately effectively reduce the thickness of the fingerprint identification apparatus.

Further, with comprehensively considering factors such as cost, process, fingerprint imaging performance, and like, the bottom light shielding layer of the at least one light shielding layer is provided with N light passing holes, where the largest aperture $D_1$ of each light passing hole of the bottom light shielding layer and the largest aperture CA of the micro-lens satisfy $0.02 \leq D_1/CA \leq 0.4$, to implement constraints on the structure and parameters of the optical system of the fingerprint identification apparatus, which can further reduce the influence of stray light on the image, reduce image confusion, balance the brightness and contrast of the image, and achieve better imaging effects for various targets including fingerprints, while achieving a super thin fingerprint identification apparatus, so that the performance of the fingerprint identification apparatus can be further improved and the accuracy of fingerprint identification can be improved.

In a possible implementation manner, the largest aperture $D_1$ of each light passing hole of the bottom light shielding layer and the largest aperture CA of the micro-lens satisfy $0.08 \leq D_1/CA \leq 0.18$.

In a possible implementation manner, the largest aperture $D_1$ of each light passing hole of the bottom light shielding layer and the largest aperture CA of the micro-lens satisfy $0.12 \leq D_1/CA \leq 0.14$.

In a possible implementation manner, a radius of curvature ROC of the micro-lens and a depth distance $Z_1$ between a lower surface of the bottom light shielding layer and a lower surface of the micro-lens satisfy $0.25 \leq ROC/Z_1 \leq 0.75$.

Through the technical solution of the present embodiment, a radius of curvature ROC of a micro-lens and a depth distance $Z_1$ between a lower surface of a bottom light shielding layer and a lower surface of the micro-lens are constrained to satisfy a condition of $0.25 \leq ROC/Z_1 \leq 0.75$, which comprehensively considers the proportional relationship between a focal point of the micro-lens and a location of the bottom light shielding layer, such that a target fingerprint signal in each direction of target fingerprint light signals in N directions is converged by the micro-lens and the target fingerprint light signals all focus or nearly focus at the light passing holes of the bottom light shielding layer, to improve the image quality and identification success rate.

In a possible implementation manner, the radius of curvature ROC of the micro-lens and the depth distance $Z_1$ between the lower surface of the bottom light shielding layer and the lower surface of the micro-lens satisfy $0.4 \leq ROC/Z_1 \leq 0.6$.

In a possible implementation manner, the radius of curvature ROC of the micro-lens and the depth distance $Z_1$ between the lower surface of the bottom light shielding layer and the lower surface of the micro-lens satisfy $0.47 \leqslant ROC/Z_1 \leqslant 0.49$.

In a possible implementation manner, the location of each light passing hole of the bottom light shielding layer satisfies $0 < S_1/Z_1 \leqslant 1$, wherein $S_1$ is a distance from a center of each light passing hole of the bottom light shielding layer to a center of a projection of the micro-lens on the bottom light shielding layer.

In the implementation manners of the present application, the location of each light passing hole of the bottom light shielding layer is further constrained, such that the target fingerprint light signals in N directions are more accurately transmitted to each light passing hole in the bottom light shielding layer, thereby further improving the image quality.

In a possible implementation manner, the location of each light passing hole of the bottom light shielding layer satisfies $0.2 \leqslant S_1/Z_1 \leqslant 0.5$.

In a possible implementation manner, the at least one light shielding layer is a plurality of light shielding layers, in addition to the bottom light shielding layer of the plurality of light shielding layers, a location of each light passing hole of an $i^{th}$ light shielding layer satisfies $0 \leqslant S_i/Z_1 \leqslant 1$, where $S_1$ is a distance from a center of each light passing hole of the $i^{th}$ light shielding layer to a center of a reflection projected on the $i^{th}$ light shielding layer by the micro-lens In the implementation manners of the present application, the locations of the plurality of light passing holes in other light shielding layers other than the bottom light shielding layer are constrained, such that the light-guiding performance of the light-guiding passages are further optimized, that is, the light signals in the target direction are allow to pass and the light signals in non-target directions are shielded, thereby reducing the influence of stray light on imaging.

In a possible implementation manner, the location of each light passing hole of the $i^{th}$ light shielding layer satisfies $0.2 \leqslant S_i/Z_1 \leqslant 0.5$.

In a possible implementation manner, an arrangement period $P_b$ of micro-lenses of the fingerprint identification apparatus and an arrangement period Pa of pixel units of the fingerprint identification apparatus satisfy $1 < P_b/P_a \leqslant 4$.

In a possible implementation manner, $P_b/P_a = 2$, and N=4.

In a possible implementation manner, the arrangement period $P_b$ of micro-lenses of the fingerprint identification apparatus satisfies $5 \mu m \leqslant P_b \leqslant 40 \mu m$.

In a possible implementation manner, the arrangement period $P_b$ of micro-lenses of the fingerprint identification apparatus satisfies $10 \mu m \leqslant P_b \leqslant 30 \mu m$.

In a possible implementation manner, the fingerprint identification unit further includes: a protective layer, where the protective layer is disposed on the bottom light shielding layer, and the protective layer, the bottom light shielding layer and the N pixel units are integrated together in a sensor chip.

In a possible implementation manner, the at least one light shielding layer is two light shielding layers, a top light shielding layer of the two light shielding layers is provided with a light passing hole, and light passing holes of the plurality of light guiding passages in the top light-blocking layer overlap each other.

In a possible implementation manner, the fingerprint identification unit further includes: an infrared filter layer, where the infrared filter layer is a filter layer coated and grown on a surface of the sensor chip, and the infrared filter layer is configured to cut out infrared light.

In a possible implementation manner, the fingerprint identification unit further includes: an adhesive layer, where the adhesive layer is a flat transparent layer coated on a surface of the infrared filter layer, and the top light shielding layer is disposed on the adhesive layer.

In a possible implementation manner, the fingerprint identification unit further includes: a first transparent medium layer, disposed on the top light shielding layer and filling the light passing hole of the top light shielding layer.

In a possible implementation manner, the fingerprint identification unit further includes: a color filter layer, disposed between the micro-lens and the first transparent medium layer, and the color filter layer includes a red filter layer, a blue filter layer, a green filter layer or a white filter layer.

In a possible implementation manner, the at least one light shielding layer is two light shielding layers, and a top light shielding layer of the two light shielding layers is provided with N light passing holes in one-to-one correspondence with the N pixel units.

In a possible implementation manner, the top light shielding layer is disposed on an upper surface of the protective layer.

In a possible implementation manner, the fingerprint identification unit further includes: a second transparent medium layer, disposed on the top light shielding layer and filling the light passing holes of the top light shielding layer.

In a possible implementation manner, the fingerprint identification unit further includes: an infrared filter layer, where the infrared filter layer is a filter layer in which a coated film grows on a surface of the second transparent medium layer, and is configured to cut out infrared light.

In a possible implementation manner, the fingerprint identification unit further includes: a color filter layer, disposed on the infrared filter layer, and the color filter layer includes a red filter layer, a blue filter layer, a green filter layer or a white filter layer.

In a possible implementation manner, the fingerprint identification unit further includes: a third transparent medium layer, disposed between the micro-lens and the color filter layer.

In a possible implementation manner, a light passing hole of the at least one light shielding layer is a round light passing hole or a rounded rectangular aperture, and the micro-lens is a spherical lens or an aspheric lens In a second aspect, an electronic device is provided, including: a display screen, and the fingerprint identification apparatus in the first aspect or any possible implementation manners of the first aspect, where the fingerprint identification apparatus is disposed under the display screen to implement under-screen optical fingerprint identification.

The above fingerprint identification apparatus is provided in the electronic device, so the fingerprint identification performance of the fingerprint identification apparatus is improved, thereby improving the fingerprint identification performance of the electronic device.

BRIEF DESCRIPTION OF DRAWINGS

FIG. 10 is a schematic arrangement diagram of a pixel array of a fingerprint identification apparatus according to an embodiment of the present application.

DESCRIPTION OF EMBODIMENTS

The following describes the technical solutions in the embodiments of the present application with reference to the accompanying drawings.

It should be understood that embodiments of the present application could be applied to an optical fingerprint system, including, but not limiting to an optical fingerprint identification system and a product based on optical fingerprint imaging. Embodiments of the present application are merely described by taking the optical fingerprint system as an example but not intended to impose any limitations on embodiments of the present application. Besides, embodiments of the present application are also applicable for other systems adopting the technology of optical imaging.

As a common application scenario, the optical fingerprint system provided in embodiments of the present application may be applied to smart phones, tablets and other mobile terminals or electronic devices with a display screen. More specifically, in the above electronic devices, a fingerprint identification apparatus may specifically be an optical fingerprint apparatus, disposed under part of or entire region of a display screen, thereby forming an under-display optical fingerprint system. Alternatively, the fingerprint identification apparatus may also be partially or fully integrated into the display screen of the electronic device to form an in-display optical fingerprint system.

Figure 1:
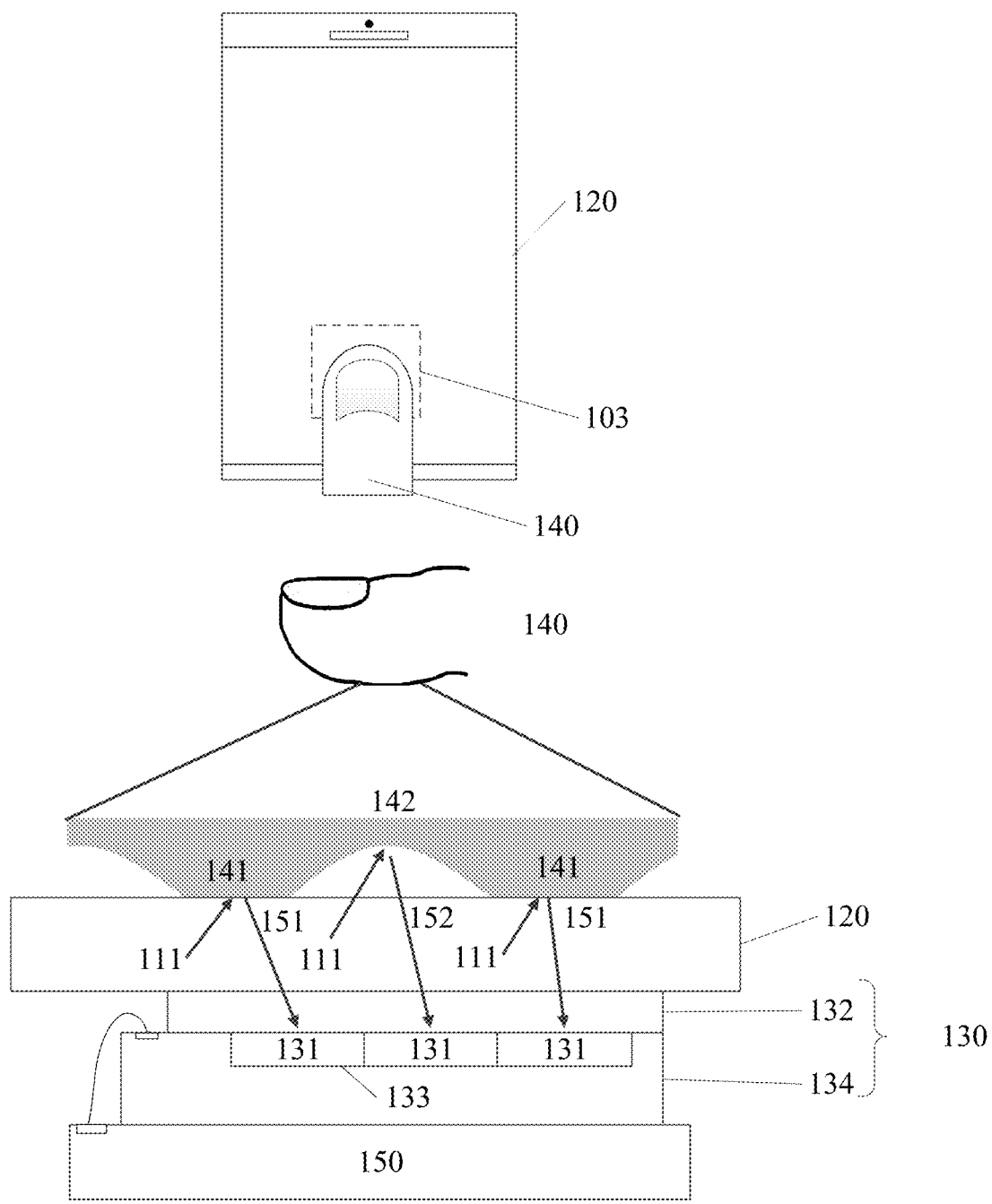
FIG. 1 is a schematic plan view of an electronic device applicable to the present application.

FIG. 1 shows a schematic structural diagram of an electronic device applicable to an embodiment of the present application. The electronic device 10 includes a display screen 120 and an optical fingerprint apparatus 130, where the optical fingerprint apparatus 130 is disposed under part of the region of the display screen 120. The optical fingerprint apparatus 130 includes an optical fingerprint sensor, the optical fingerprint sensor includes a sensor array 133 with a plurality of optical sensor units 131, the region where the sensor array 133 is located or its sensing region is a fingerprint detection region 103 of the optical fingerprint apparatus 130. As shown in FIG. 1, the fingerprint detection region 103 is located in a display region of the display screen 120. In an alternative embodiment, the optical fingerprint apparatus 130 may also be arranged at other locations, such as a side surface of the display screen 120 or a non-transparent region at an edge of the electronic device 10. The light signals of at least part of the display region of the display screen 120 are guided to the optical fingerprint apparatus 130 through optical path design, such that the fingerprint detection region 103 is actually located in the display region of the display screen 120.

It should be understood that an area of the fingerprint detection region 103 may be different from an area of the sensor array of the optical fingerprint apparatus 130. For example, through the lens imaging optical path design, reflective folding optical path design, or other optical path designs such as light convergence or reflection, the area of the fingerprint detection region 103 of the optical fingerprint apparatus 130 may be made to be greater than the area of the sensor array of the optical fingerprint apparatus 130. In other alternative implementations, for example, if light collimation is adopted to guide the optical path, the fingerprint detection region 103 of the optical fingerprint apparatus 130 may also be designed to be substantially the same as the area of the sensor array of the optical fingerprint apparatus 130.

Therefore, when a user need to unlock the electronic apparatus or other fingerprint verifications, the user only need to press a finger on the fingerprint detection region 103 located on the display screen 120 to input a fingerprint. Since the fingerprint detection can be implemented in display, the electronic apparatus 10 may adopt the above structure instead of reserving a specific space on its front surface for a fingerprint button (such as a Home button), so that a full-screen solution may be adopted, that is, the display region of the display screen 120 may basically extend to the front surface of the entire electronic device 10.

In one optional implementation manner, as shown in FIG. 1, the optical fingerprint apparatus 130 includes a photo detection portion 134 and an optical element 132, where the photo detection portion 134 includes a sensor array and a reading circuit or other auxiliary circuits connected to the sensor array, and it can be produced in a die with semiconductor technology process, such as an optical imaging chip or an optical fingerprint sensor. The sensor array is specifically a photo detector array, including a plurality of photo detectors arranged in an array, and the photo detector may be used as the above optical sensor unit. The optical element 132 may be disposed on the sensor array of the optical detection portion 134, and it may specifically include a light guiding layer or an optical path guiding structure and other optical elements. The light guiding layer or the optical path guiding structure is mainly configured to guide the reflected light reflected from the finger surface to the sensor array for optical detection.

In a specific implementation, the optical element 132 and the optical detection portion 134 may be sealed in a same optical fingerprint component. For example, the optical component 132 and the optical detection portion 134 may be sealed in the same optical fingerprint chip, or the optical component 132 may be arranged outside the chip where the optical detection portion 134 is located, for example, the optical component 132 may be attached on the chip, or part of the components of the optical component 132 are integrated in the above chip.

Here, there are many implementation solutions of the light guiding layer or optical path guiding structure of the optical component 132. For example, the light guiding layer may be specifically a collimator layer made on a semiconductor silicon wafer, which has a plurality of collimating units or micro-aperture array. The collimating unit can be specifically a small aperture. Among the reflected light reflected from the finger, the light that is perpendicularly incident on the collimating unit can pass through and be received by the optical sensor unit below, and the light with excessive incident angle is attenuated by multiple reflections inside the collimating unit. Therefore, each optical sensor unit can basically only receive the reflected light reflected by the fingerprint pattern directly above it, so that the sensor array can detect the fingerprint image of the finger.

In another embodiment, the light guiding layer or the optical path guiding structure may also be an optical lens layer, which has one or more lens units, such as a lens group composed of one or more aspheric lenses, configured to converge the reflected light reflected from the finger to the sensor array of the light detection portion 134 below it, such that the sensor array can perform imaging based on the reflected light, thereby obtaining a fingerprint image of the finger. Optionally, the optical lens layer may be formed with a pinhole in the optical path of the lens unit. The pinhole may expand the field of view of the optical fingerprint apparatus, in cooperation with the optical lens layer, to improve the fingerprint imaging effect of the optical fingerprint apparatus 130.

In other embodiments, the light guiding layer or the optical path guiding structure may also specifically be a micro-lens layer, and the micro-lens layer has a micro-lens array formed with a plurality of micro-lenses. The micro-lens layer can be formed on the sensor array of the light detection portion 134, through semiconductor growth process or other processes, and each micro-lens may correspond to one of the sensor units of the sensor array, respectively. In addition, other optical film layers may be formed between the micro-lens layer and the sensor unit, such as a dielectric layer or a passivation layer. More specifically, a light shielding layer with micro holes may also be formed between the micro-lens layer and the sensor unit, where the micro-aperture is formed between the corresponding micro-lens and the sensor unit. The light shielding layer may block the optical interference between the adjacent micro-lens and the sensor unit, such that the light corresponding to the sensor unit converge into the micro-aperture through the micro-lens and the light is transmitted to the sensor unit through the micro-aperture for optical fingerprint imaging. It should be understood that several implementation solutions of the above optical path guiding structure can be used alone or in combination. For example, a micro-lens layer can be further provided under the collimator layer or the optical lens layer. Of course, when the collimator layer or the optical lens layer is used in combination with the micro-lens layer, the specific laminated structure or optical path may need to be adjusted according to actual needs.

In an optional embodiment, the display screen 120 may be a display with a light-emitting display unit, such as organic light-emitting diode (OLED) display screen or micro-LED display screen. Taking the OLED display screen as an example, the optical fingerprint apparatus 130 may use the display unit (that is, OLED light source) of the OLED display screen 120 located in the fingerprint detection region 103 as an exciting light source for optical fingerprint detection. When the finger 140 presses on the fingerprint detection region 103, the display screen 120 emits a light beam 111 to the target finger 140 above the fingerprint detection region 103. The light 111 is reflected by the surface of the finger 140 to form a reflected light or scattered by the inside of the finger 140 to form a scattered light. In related patent applications, for convenience of description, the above reflected light and scattered light are collectively referred to as a reflected light. Since ridges and valleys of a finger have different reflectivity, light intensity of the reflected light from the ridge of the fingerprint and the reflected light from the valley of the fingerprint are different. After passing through the optical assembly 132, the reflected light is received by the optical detection portion 134 of the optical fingerprint apparatus 130 and converted to a corresponding electronic signal, that is, a fingerprint detection signal. Data of a fingerprint image may thus be obtained based on the fingerprint detection signal, and a further fingerprint matching can be performed so as to implement optical fingerprint identification on the electronic device 10.

In other embodiments, the optical fingerprint apparatus 130 may also use a built-in light source or an external light source to provide a light signal for fingerprint detection. In this case, the optical fingerprint apparatus 130 may be applicable for non-self-emitting display screens, such as a liquid crystal display screen or other passively-emitting display screens. Taking an application of a liquid crystal display screen with a backlight module and a liquid crystal panel as an example, in order to support the under-screen fingerprint detection of the liquid crystal display screen, the optical fingerprint system of the electronic device 10 may also include an exciting light source for optical fingerprint detection. The exciting light source may also be specifically an infrared light source or a light source of invisible light of a specific wavelength, which can be arranged under the backlight module of the liquid crystal display screen or in the edge region under a protection cover of the electronic device 10. The optical fingerprint apparatus 130 may be disposed under a liquid crystal panel or the edge region of the protection cover and guided by the optical path so that the fingerprint detection light can be guided through the optical path and reach the optical fingerprint apparatus 130. Alternatively, the optical fingerprint apparatus 130 may also be arranged under a backlight module. Film layers such as a diffusion sheet, a brightness enhancement sheet, a film layer and like are opened with holes in the backlight module or other optical designs to allow the fingerprint detection light to pass through the liquid crystal panel and the backlight module and reach the optical fingerprint apparatus 130. When the optical fingerprint apparatus 130 uses the built-in light source or the external light source to provide a light signal for fingerprint detection, its detection principle is the same as the content described above.

It should be understood that, in a specific implementation, the electronic device 10 further includes a transparent protection cover 710, the protection cover 710 may be a glass cover or a sapphire cover, which is located on the display screen 120 and covers a front surface of the electronic device 10. In embodiments of the present application, since the so-called the finger press on the display screen 120 is actually referred to as the press on the cover on the display screen 120 or a surface of the protective layer covering the cover.

It should also be understood that the electronic device 10 may further include a circuit board 150 disposed under the optical fingerprint apparatus 130. The optical fingerprint apparatus 130 may be adhered to the circuit board 150 through an adhesive, and is electronically connected to the circuit board 150 through soldering pads and metal wires. The optical fingerprint apparatus 130 may implement electronic interconnection and signal transmission with other peripheral circuits or other components of the electronic device 10 through the circuit board 150. For example, the optical fingerprint apparatus 130 can receive a control signal of a processing unit of the electronic device 10 through the circuit board 150, and can also output the fingerprint detection signal from the optical fingerprint apparatus 130 to a processing unit or a control unit of the electronic device 10 through the circuit board 150, and like.

On the other hand, in some embodiments, the optical fingerprint apparatus 130 may only include one optical fingerprint sensor. At this time, the fingerprint detection region 103 of the optical fingerprint apparatus 130 has a small area and a fixed location. Therefore, when the user needs to input the fingerprint, he needs to press the finger on a specific location of the fingerprint detection region 103, otherwise the optical fingerprint apparatus 130 may not be able to collect the fingerprint image, resulting in poor user experience. In other alternative embodiments, the optical fingerprint apparatus 130 may specifically include a plurality of optical fingerprint sensors, the plurality of optical fingerprint sensors may be arranged side by side under the display screen 120 in a splicing manner, and the sensing regions of the plurality of optical fingerprint sensors together constitute the fingerprint detection region 103 of the optical fingerprint apparatus 130. In other words, the fingerprint detection region 103 of the optical fingerprint apparatus 130 may include a plurality of sub-regions, and each sub-region corresponds to one sensing region of the optical fingerprint sensors, so that the fingerprint collection region 103 of the optical fingerprint apparatus 130 may be extended to a main region of the lower half of the display screen, that is, to the region where the finger is conventionally pressed, so as to implement blind fingerprint input operation. Alternatively, when the number of optical fingerprint sensors is sufficient, the fingerprint detection region 103 may also be extended to half of the display region or even the entire display region, thereby implementing half-screen or full-screen fingerprint detection.

It should also be understood that, in embodiments of the present application, the sensor array in the optical fingerprint apparatus may also be referred to as a pixel array, and an optical sensor unit or a sensor unit in the sensor array may also be referred to as a pixel unit.

It should be noted that the optical fingerprint apparatus in embodiments of the present application may also be referred to as an optical fingerprint identification module, a fingerprint identification apparatus, a fingerprint identification module, a fingerprint module, a fingerprint collection apparatus, or the like, and the foregoing terms may be replaced with each other.

Figure 2:
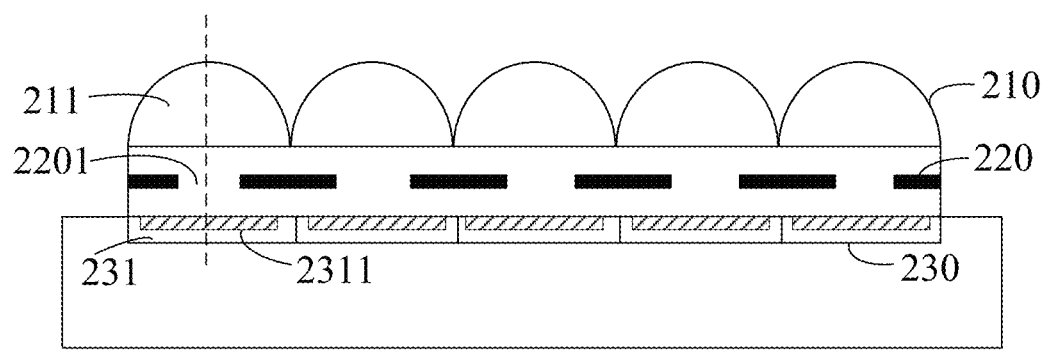
FIGS. 2 and 3 are a schematic cross-sectional view and a schematic top view of a fingerprint identification apparatus.
Figure 3:
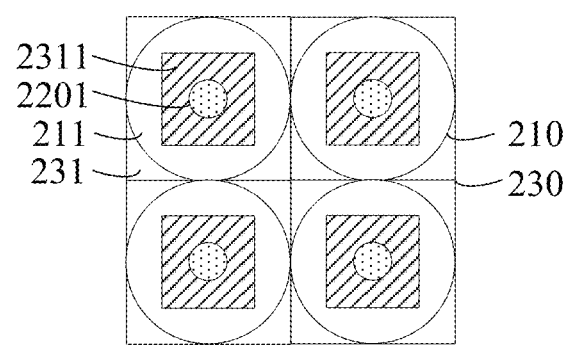

FIGS. 2 and 3 show a schematic cross-sectional view and a schematic top view of a fingerprint identification apparatus.

As shown in FIGS. 2 and 3, the fingerprint identification apparatus 200 includes a micro-lens array 210, at least one light shielding layer 220 and a pixel array 230. The micro-lens array 210 is located right above the pixel array 230 and at least one light shielding layer 220, and one micro-lens 211 corresponds to one pixel unit 231, that is, each micro-lens 211 of the micro-lens array 210 focuses the received light on the pixel unit 231 corresponding to the same micro-lens 211 through a small hole 2201 of the light shielding layer 220. Where the light signal received by each micro-lens 211 is mainly the fingerprint light signal incident perpendicular to the micro-lens array 210 after being reflected or scattered by the finger above the display screen.

As shown in FIG. 3, the pixel units 231 in the pixel array 230 are arranged periodically, and the photosensitive region 2311 of each pixel unit 231 in the pixel array 230 is arranged at the center of the same pixel unit, to improve the duty cycle of the photosensitive region.

In other words, the plurality of micro-lenses 211 in the micro-lens array 210 are in one-to-one correspondence with the plurality of pixel units 231 in the pixel array 230, and the photosensitive regions 2311 of the plurality of pixel units 231 in the pixel array 230 are periodically arranged and uniformly distributed.

However, the photosensitive region of the pixel array 230 will be affected by the size of the micro-lens array 210, and the thickness of the fingerprint identification apparatus 200 is relatively large, which further increases the processing difficulty, cycle and cost of the optical path of the fingerprint identification apparatus 200.

In the fingerprint identification apparatus 200, since the plurality of micro-lenses are adjacent to each other, light may arrive on the surface of the chip from other micro-lenses, thereby affecting the imaging effect. And since the micro-lenses are one-to-one correspondence with the pixel units, the theoretical maximum signal amount that a pixel unit can receive is the amount of energy of the collimated light when the micro-lens occupies the whole area of a pixel unit. This receiving method limits the further increase of the amount of image signal, and under weak lighting, the signal-to-noise ratio is low, which affects the image quality.

In addition, in normal life scenarios, such as after washing hands, waking up in the morning, finger wiping, low temperatures, and like, the fingers are usually dry and their cuticle layer is uneven, and when they press on the display screen, there will be poor contact in part of the region of the finger. When the dry finger is not in good contact with the display screen, the fingerprint image formed by the above fingerprint identification apparatus 200 in the vertical direction has poor contrast between the fingerprint ridges and the fingerprint valleys, and the image is so blurred that the fingerprint lines cannot be distinguished, thus the above fingerprint identification apparatus 200 has poor fingerprint identification performance for dry fingers.

Based on the above problems, the present application proposes a fingerprint identification apparatus 300 that uses one or more light shielding layers provided with an array of small holes in combination with a micro-lens array, and each micro-lens corresponds to N pixel units, where N is a positive integer greater than 1. Each pixel unit of the N pixel units receives a tilted collimated light converged by the entire micro-lens, but the N pixel units corresponding to one micro-lens receive the incident light tilted in different directions. Finally, N images can be taken out from the image chip array, each of which is composed of pixel units received in the same tilted direction. This receiving method can greatly improve the contrast and brightness of the image, and can also implement other application directions such as expanding the size of the field of view on the object side.

Figure 4:
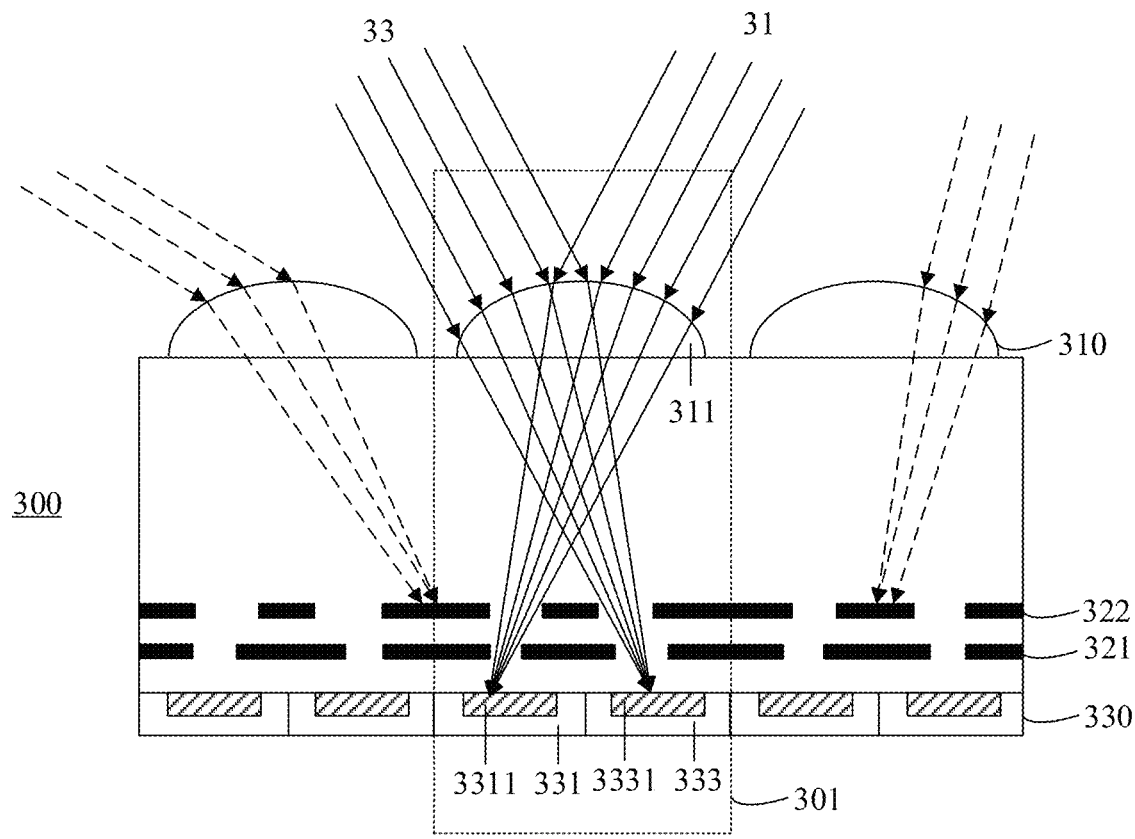
FIGS. 4 to 6 are a schematic cross-sectional view, a schematic top view, and a schematic three-dimensional view of another fingerprint identification apparatus according to an embodiment of the present application.
Figure 5:
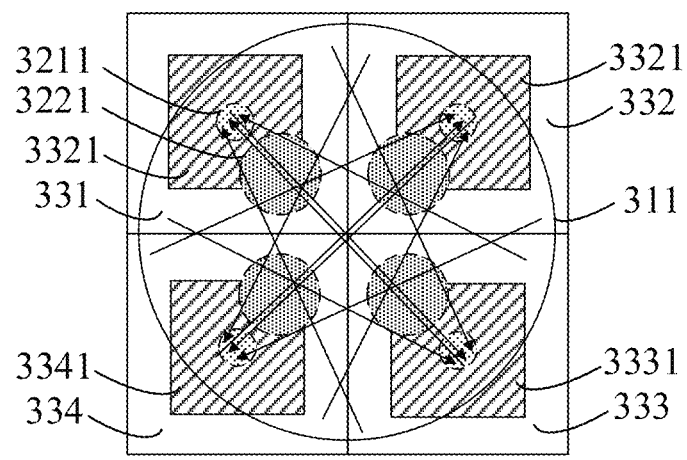
Figure 6:
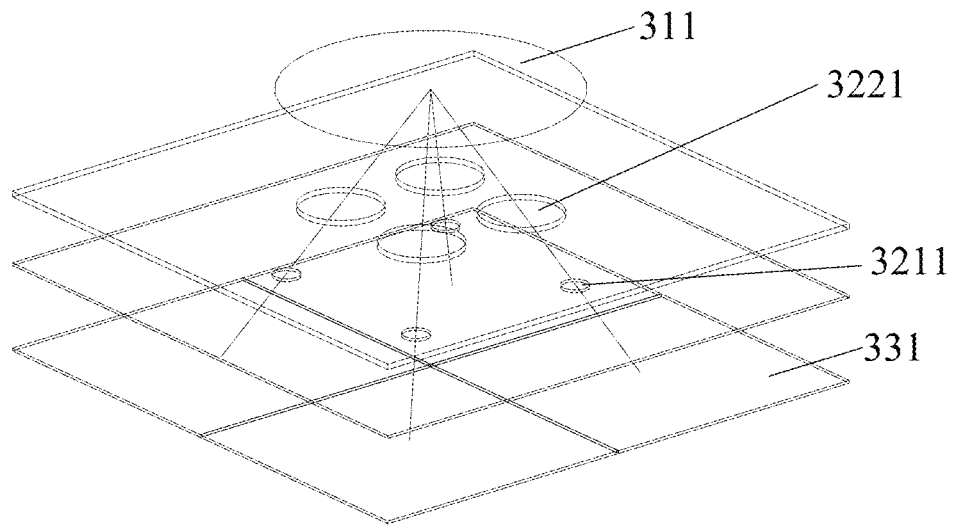

FIGS. 4 to 6 show a schematic cross-sectional view, a schematic top view, and a schematic three-dimensional view of another fingerprint identification apparatus.

As shown in FIGS. 4-6, the fingerprint identification apparatus 300 includes: a micro-lens array 310, at least one light shielding layer, such as a first light shielding layer 321 and a second light shielding layer 322 shown in the figure, and a pixel array 330. The at least one light shielding layer is formed with a plurality of light guiding passages in different directions corresponding to each micro lens in the micro lens array 310, and the bottom of each light guiding passage in the plurality of light guiding passages in different directions is provided with a pixel unit.

In a specific implementation, the transmittance of each light shielding layer in the at least one light shielding layer to light of a specific wavelength band (such as visible light or above 610 nm) is less than a preset threshold (such as 20%) to prevent a corresponding light from passing through.

In the embodiment of the present application, the plurality of light guiding passages corresponding to each micro-lens and the pixel unit provided at the bottom of the plurality of light guiding passages may be regarded as a fingerprint identification unit 301, and the fingerprint identification apparatus 300 in the embodiment of the present application may be regarded as an apparatus formed by an array of the plurality of the fingerprint identification unit 301. Here, the plurality of micro-lenses in the plurality of fingerprint identification units 301 form the above micro-lens array 310, the partial light shielding layers in the plurality of fingerprint identification units 301 form the above at least one light shielding layer by splicing, and the plurality of pixel units of the plurality of fingerprint identification units 301 form the above pixel array 330.

For convenience of description, the fingerprint identification apparatus in embodiments of the present application will be introduced in the following using the fingerprint identification unit 301 as a unit, and the partial light shielding layer in the fingerprint identification unit 301 is simply referred to as the light shielding layer.

In some embodiments, in the fingerprint identification unit 301, one micro-lens corresponds to four pixel units.

For example, as shown in FIGS. 4 to 6, in the fingerprint identification unit 301, a first pixel unit 331, a second pixel unit 332, a third pixel unit 333, and a fourth pixel unit 334 are correspondingly provided under the first micro-lens 311, and the four pixel units are respectively located at the bottom of four light guiding passages in different directions.

Specifically, each pixel unit is provided with a photosensitive region (also called active area) for respectively receiving four target fingerprint light signals passing through the four light guiding passages and converting them into corresponding electronic signals. The photosensitive region may be the region where a photo diode in the pixel unit is located, that is, the region in the pixel unit that receives the light signals, and other regions in the pixel unit may be configured to set other circuits in the pixel unit and to arrange the wiring between the pixels. Specifically, the first photosensitive region 3311 in the above first pixel unit 331, the second photosensitive region 3321 in the second pixel unit 332, the third photosensitive region 3331 in the third pixel unit 333, and the fourth photosensitive region 3341 in the fourth pixel unit 334 are all arranged at the bottom of the above four light guiding passages in different directions.

Optionally, in some embodiments, for example, as shown in FIGS. 4 to 6, the four light guiding passages corresponding to the first micro-lens 311 are provided with four light passing holes on both the first light shielding layer 321 and the second light shielding layer 322, and the four light passing holes on each light shielding layer correspond to four pixel units. For example, in FIG. 5, the first light shielding layer 321 is provided with a 1# light passing hole 3211 corresponding to the first pixel unit 331, and the second light shielding layer 322 is provided with a 2# light passing hole 3221 corresponding to the first pixel unit 331. The 1# light passing hole 3211 and the 2# the light passing hole 3221 are the light passing holes of the first light guiding passage corresponding to the first pixel unit 331. In other words, the 1# light passing hole 3211 and the 2# light passing hole 3221 form the first light guiding passage corresponding to the first pixel unit 331. Optionally, centers of the 1# light passing hole 3211 and the 2# light passing hole 3221 may be on a straight line, and the direction of the straight line is the direction of the first light guiding passage. A tilted light signal 31 in a first direction is converged by the first micro-lens 311 and reaches the first photosensitive region 3311 of the first pixel unit 331 through the first light guiding passage, and light signals in other directions (such as light signals indicated by the dashed line in the figure) are shielded in the light shielding layer and cannot be transmitted to the pixel unit.

Where the above tilted light signal 31 in the first direction may be fingerprint tilted light signal reaching the first direction of the first micro-lens 311 after being reflected or scattered by the finger above the display screen and passing through the display screen, and the tilted light signal 31 in the first direction may be configured to detect fingerprint information.

Similarly, the configuration of light passing holes corresponding to other pixel units below the first micro-lens 311 may refer to the configuration of light passing holes corresponding to the first pixel unit above, other pixel units may receive tilted light signals in other directions as well. The tilted light signals in other directions are converged by the first micro-lens 311 and passing through the light guiding passages formed by light passing holes, and then are transmitted to the corresponding pixel unit. For example, in FIG. 4, a tilted light signal 33 in a third direction is converged by the first micro-lens 311 and reaches the third photosensitive region 3311 of the third pixel unit 333 through the third light guiding passage.

In other embodiments, the four light guiding passages corresponding to each micro-lens are provided with four light passing holes in the first light shielding layer 321, and the four light passing holes correspond to four pixel units, and only one light passing hole is provided on the second light shielding layer 322, in other words, the light passing holes of the four light guiding passages of in the second light shielding layer 322 overlap each other.

Figure 7:
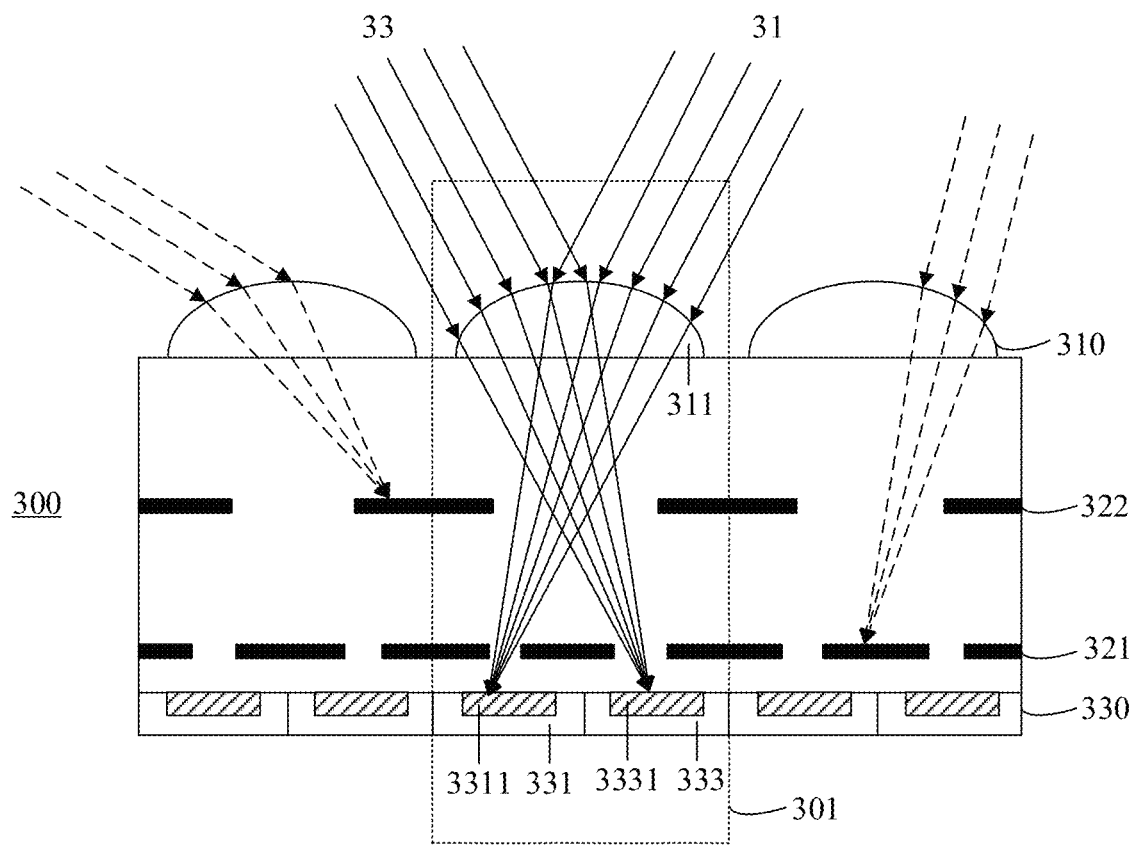
FIGS. 7 to 9 are a schematic cross-sectional view, a schematic top view, and a schematic three-dimensional view of another fingerprint identification apparatus according to an embodiment of the present application.
Figure 8:
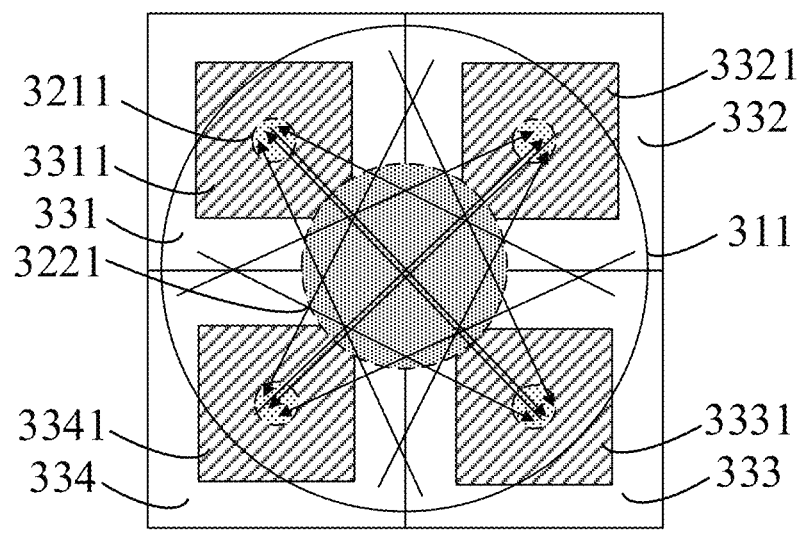
Figure 9:
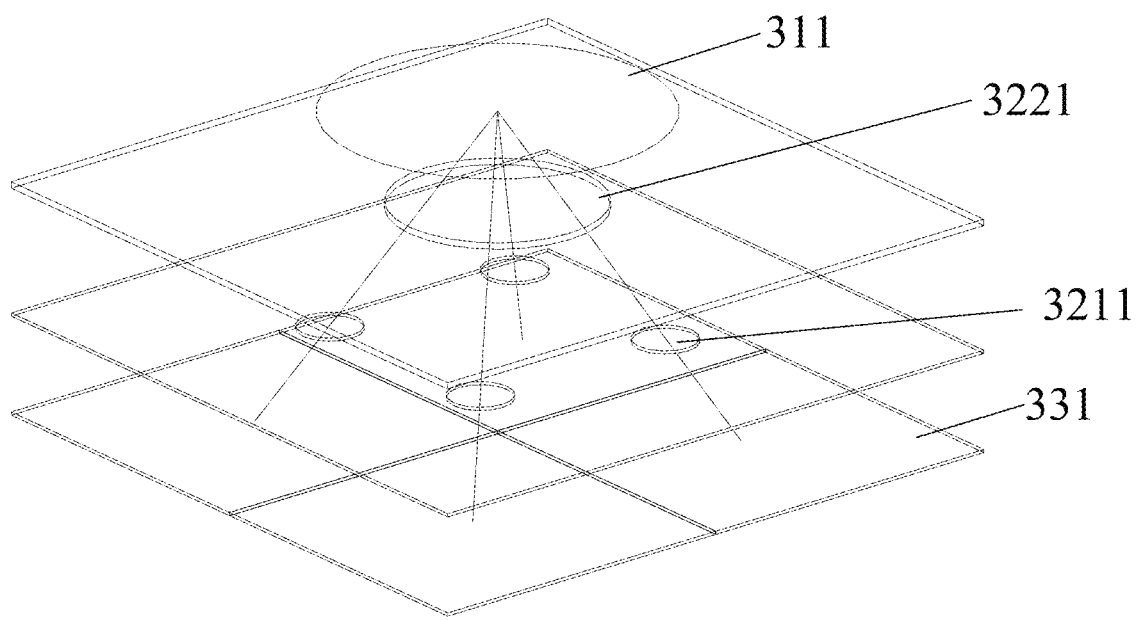

FIGS. 7 to 9 show a schematic cross-sectional view, a schematic top view, and a schematic three-dimensional view of another fingerprint identification apparatus.

In FIGS. 7, 8 and 9, the first light shielding layer 321 is provided with a 1# light passing hole 3211 corresponding to the first pixel unit 331, and the second light shielding layer 322 is provided with a large 2# light passing hole 3221, the 2# light passing hole 3221 corresponds to four pixel units. The 1# light passing hole 3211 and the 2# light passing hole 3221 form a first light guiding passage corresponding to the first pixel unit 331. Optionally, centers of the 1# light passing hole 3211 and the 2# light passing hole 3221 may be on a straight line, and the direction of the straight line is the direction of the first light guiding passage. A tilted light signal 31 in a first direction is converged by the first micro-lens 311 and reaches the first photosensitive region 3311 of the first pixel unit 331 through the first light guiding passage, and light signals from other directions (such as light signals indicated by the dashed line in the figure) are shielded in the light shielding layer and cannot be transmitted to the pixel unit.

Similarly, the arrangement of light passing holes corresponding to other pixel units may be referred to the arrangement of light passing holes corresponding to the first pixel unit above, which will not be described herein.

In the above application embodiment, the four pixel units corresponding to each micro-lens in the fingerprint identification apparatus 300 all receive four tilted light signals in four different directions of through four light guiding passages in different directions. Therefore, the pixel array 330 in the fingerprint identification apparatus 300 can generate four fingerprint images based on the received light signals in four different directions, and then obtain a high-resolution fingerprint image to improve the fingerprint identification effect.

FIG. 10 shows a schematic diagram of the arrangement of a pixel array 330. As shown in FIG. 10, where "1" represents a pixel unit for receiving tilted light signals in a first direction, and "2" represents a pixel unit for receiving tilted light signals in a second direction, "3" represents a pixel unit for receiving tilted light signals in a third direction, and "4" represents a pixel unit for receiving the tilted light signals in a fourth direction. That is, in the pixel array 330, all the pixel units represented by "1" can be configured to generate a first fingerprint image, and all the pixel units represented by "2" can be configured to generate a second fingerprint image, all the pixel units represented by "3" can be configured to generate a third fingerprint image, and all the pixel units represented by "4" can be configured to generate a fourth fingerprint image, that is, a total of 4 fingerprint images can be generated. The four fingerprint images can be configured for fingerprint identification alone, or they can be combined to form a high-resolution fingerprint image to improve the identification effect of the fingerprint identification apparatus.

Furthermore, since the four fingerprint images are formed and obtained through tilted light signals in different directions, the four fingerprint images corresponds to different imaging regions of the object side. Other application directions such as expanding the size of the field of view on the object side can also be implemented.

Through the solution of the present embodiment, through the design of the optical path, the four pixel units corresponding to the single micro-lens can receive light signals in four directions, thereby increasing the amount of the light entering the fingerprint identification apparatus, reducing the time of exposure, and increasing the field of view. In the meantime, an imaging optical path formed by a single micro-lens matching with a multi-pixel unit can perform non-vertical light imaging on the object-side light beam of the fingerprint (that is, tilted light imaging), which can improve identification effect of dry fingers and expand an object-side numerical aperture of an optical system, reduce a thickness of an optical path design of the pixel array, and ultimately effectively reduce the thickness of the fingerprint identification apparatus.

It can be understood that, in the fingerprint identification unit 301 described above, the example of the four pixel units corresponding to one micro-lens illustrates the structure of the fingerprint identification apparatus and the principle of fingerprint imaging. Optionally, in the fingerprint identification unit 301, a micro-lens may further correspond to two, three, or more than four pixel units. The number of the pixel unit in the fingerprint identification unit is not limited in the embodiments of the present application.

Based on the above technical solution that one micro-lens in the fingerprint identification apparatus corresponds to N pixel units, and further, comprehensively considering factors such as cost, process, fingerprint imaging performance, and like, the structure and parameters of the optical system of the fingerprint identification apparatus are constrained and limited, which can further reduce the influence of stray light on the image, reduce image confusion, balance the brightness and contrast of the image, and achieve better imaging effects for various targets including fingerprints, while achieving a super thin fingerprint identification apparatus, so that the performance of the fingerprint identification apparatus can be further improved and the accuracy of fingerprint identification can be improved.

Specifically, the embodiment of the present application is provided with a fingerprint identification apparatus 400, the fingerprint identification apparatus 400 is applicable to be under a display screen to implement under-screen optical fingerprint identification. The fingerprint identification apparatus includes a plurality of fingerprint identification units 401 arranged in a square array.

Figure 11:
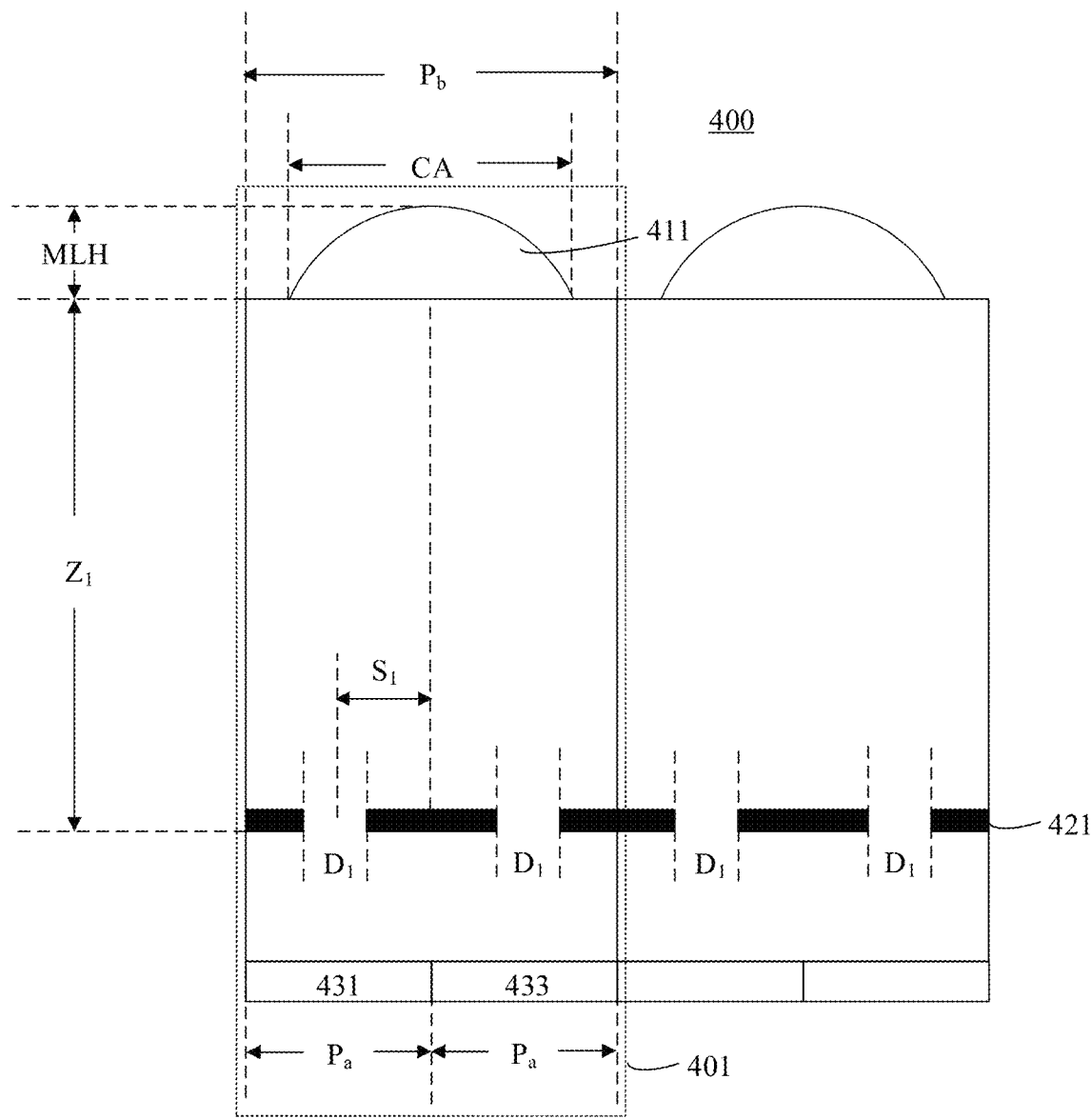
FIGS. 11 and 12 are a schematic cross-sectional views and a schematic top views of a fingerprint identification apparatus and a fingerprint identification unit thereof according to an embodiment of the present application.
Figure 12:
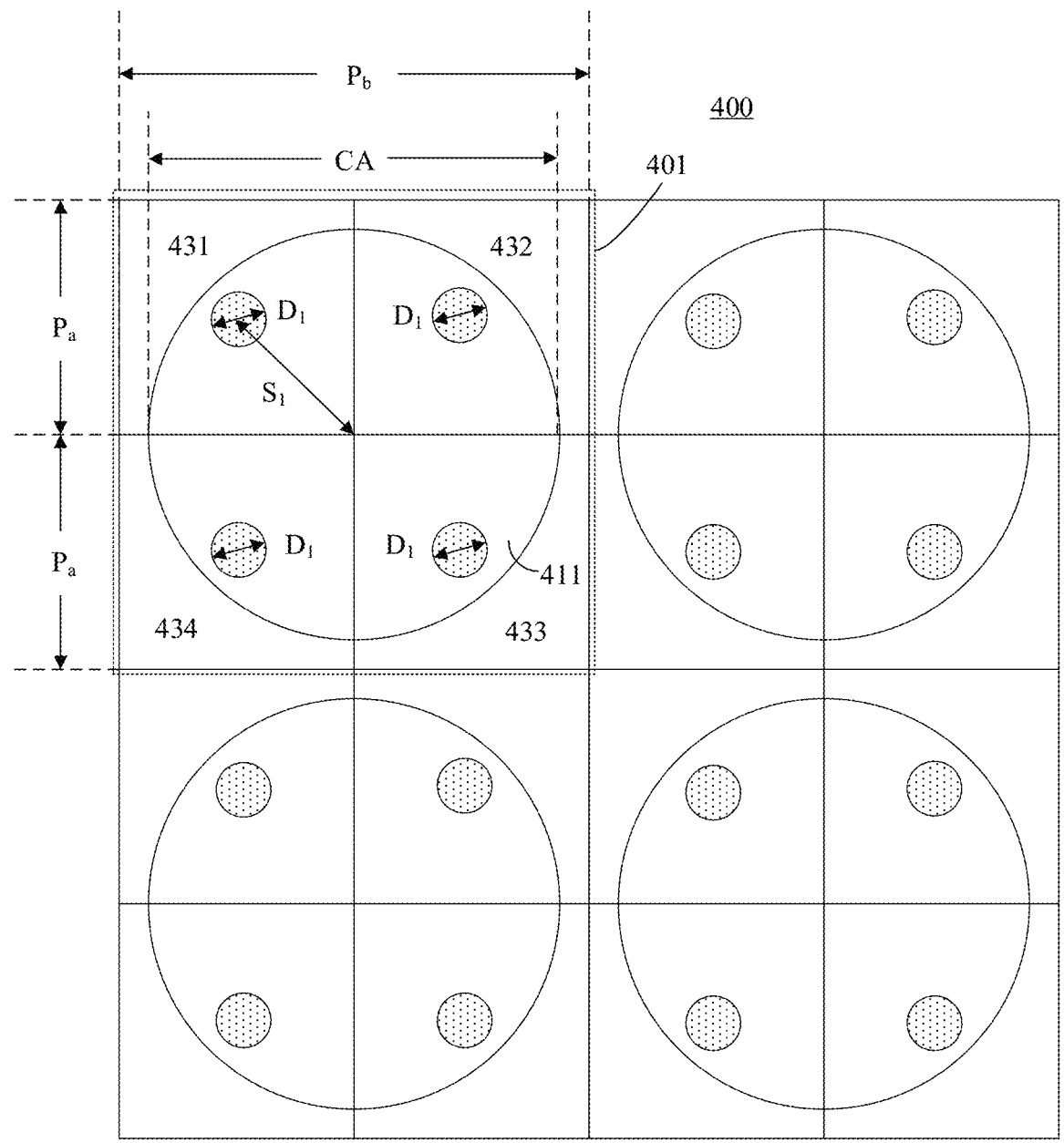

FIGS. 11 and 12 show a schematic cross-sectional view and a schematic top view of a fingerprint identification apparatus 400.

As shown in FIGS. 11 and 12, in the fingerprint identification apparatus 400, each fingerprint identification unit 401 includes:

a micro-lens 411;

at least one light shielding layer, each light shielding layer of the at least one light shielding layer provided with a light passing hole(s), and a bottom light shielding layer of the at least one light shielding layer (for example, the first light shielding layer 421 in FIGS. 11 and 12) provided with N light passing holes, where a largest aperture $D_1$ of each light passing hole of the bottom light shielding layer and a largest aperture CA of the micro-lens satisfy $0.02 \leq D_1/CA \leq 0.4$, to form N light guiding passages in different directions;

N pixel units, disposed under the at least one light shielding layer, and the N pixel units disposed at bottom of the N light guiding passages in one-to-one correspondence;

where after fingerprint light signals reflected or scattered by a finger above the display screen are converged by the micro-lens, N target fingerprint light signals in different directions are transmitted to the N pixel units through the N light guiding passages respectively, and the N target fingerprint light signals are configured to detect fingerprint information of the finger for fingerprint identification.

Optionally, considering the problems of process and cost, in the embodiment of the present application, the number N of pixel units in each fingerprint identification unit 401 may be A×A, where $1 < A \leq 4$, and A is a positive integer, preferably, A=2 or 3.

For example, FIG. 11 and FIG. 12 show the structures of the fingerprint identification unit 401 and the fingerprint identification apparatus 400 when A=2 and N=2×2. For related solutions, please refer to the related descriptions in FIGS. 4 to 7 above.

Optionally, in the embodiment of the present application, $A=P_b/P_a$, where $P_b$ is the arrangement period of the plurality of micro-lenses in the fingerprint identification apparatus, and Pa is the arrangement period of the plurality of pixel units in the fingerprint identification apparatus.

For example, as show in FIG. 12, after the plurality of fingerprint identification units 401 are arranged in an array, in which the plurality of micro-lenses form a micro-lens array, and the plurality of pixel units form a pixel array. In the horizontal plane, the arrangement period of the plurality of micro-lenses is $P_b$ in both the X and Y directions, and the arrangement period of the plurality of pixel units is $P_a$ in both the X and Y directions. In the present application, the horizontal plane is parallel to the plane in which the display screen is located and the vertical plane is perpendicular to the plane in which the display screen is located.

Considering the image space sampling rate and the process cost comprehensively, in some embodiments, 5 $\mu m \leq P_b \leq 40$ $\mu m$, preferably, 10 $\mu m \leq P_b \leq 30$ $\mu m$.

Specifically, in the embodiment of the present application, $D_1$ represents the maximum diameter of each light passing hole in the bottom light shielding layer. In some embodiments, as shown in FIG. 12, the bottom light shielding layer, that is, the first light shielding layer 421 in FIG. 12, in which the plurality of light passing holes in are round holes, and the $D_1$ represents the diameter of the light passing holes.

In other embodiments, the plurality of light passing holes in the bottom of the light shielding layer are rounded rectangular holes, and the $D_1$ represents the distance between diagonals of the light passing hole.

In embodiment of the present application, t the round light passing hole or the rounded rectangular hole has good symmetry, so light signals in various direction have symmetric light passing performance, and the balance of the image in all directions can be improved, thereby improving the image quality.

Specifically, in the embodiment of the present application, CA represents the largest aperture of the micro-lens 411, and the CA may be the maximum width of the micro-lens 411 in the largest cross-section in the horizontal direction.

Optionally, the micro-lens 411 may be a spherical lens or an aspherical lens, the upper surface of which is spherical or aspherical, and the lower surface is a horizontal plane, and the largest aperture CA of the micro-lens 411 may be the maximum width of the lower surface.

For example, in FIGS. 11 and 12, the micro-lens 411 may be a spherical lens, the lower surface of which is a round horizontal plane, and the largest aperture CA of the micro-lens 411 is the diameter of the round horizontal plane.

Through the technical solution of embodiment of the present application, the largest aperture $D_1$ of each light passing hole in the bottom light shielding layer and the largest aperture CA of the micro-lens are constrained to satisfy $0.02 \leq D_1/CA \leq 0.4$, comprehensively considering the proportional relationship between the light receiving region of the micro-lens and the size of the light passing hole, when the proportional relationship is less than or equal to 0.4, each light passing hole in the bottom light shielding layer below the current micro-lens can efficiently block the stray light transmitted by adjacent micro-lenses, reduce the confusion of images, thereby increasing the contrast of imaging, or increasing the contrast of images; when the proportional relationship is greater than or equal to 0.02, sufficient light signals are guaranteed to pass through each light passing hole of the bottom light shielding layer ensure the brightness of the image, so that the solution of the embodiment of the present application can take into account the image brightness as well as the image contrast, thereby improving the image quality and identification success rate.

Generally speaking, if the brightness and contrast of the image are needed to be increased, the number of pixel units corresponding to the micro-lens in a fingerprint identification unit can be increased, so that the light signals converged by the micro-lens can be more fully utilized, and the spatial sampling rate of the image can be improved, thereby increasing the brightness and contrast of the image. However, the use of this method will increase the difficulty of the manufacturing process and increase the cost. Therefore, using the technical solution of the embodiment of the present application, on the basis of considering the manufacturing process as well as the cost, the image brightness and contrast requirements are met by constraining the parameters in the fingerprint identification apparatus.

In some implementation manners, $0.08 \leq D_1/CA \leq 0.18$. Preferably, $0.12 \leq D_1/CA \leq 0.14$, for example: $D_1/CA=0.12$, 0.13 or 0.14, or $D_1/CA$ may also be any value between 0.12 and 0.14, which is not limited in the embodiments of the present application.

In order to balance the contrast and brightness of the image, in addition to the above constraint that the largest aperture $D_1$ of each light passing hole in the bottom light shielding layer and the largest aperture CA of the micro-lens 411 satisfy the condition of $0.02 \leq D_1/CA \leq 0.4$, the present application also proposes another solution as follows.

Specifically, as shown in FIGS. 11 and 12, in the fingerprint identification apparatus 400, each fingerprint identification unit 401 includes:

a micro-lens 411;

at least one light shielding layer, where each light shielding layer in the at least one light shielding layer provided with a light passing hole(s), and the bottom light shielding layer of the at least one light shielding layer (for example, the first light shielding layer 421 in FIG. 11 and FIG. 12) provided with N light passing holes to form N light guiding passages in different directions, where a radius of curvature ROC of the micro-lens 411 and a depth distance $Z_1$ between a lower surface of the bottom light shielding layer and a lower surface of the micro-lens 411 satisfy $0.25 \leq ROC/Z_1 \leq 0.75$;

N pixel units, disposed under the at least one light shielding layer, and the N pixel units disposed at bottom of the N light guiding passages in one-to-one correspondence;

where after fingerprint light signals returned after reflected or scattered by a finger above the display screen are converged by the micro-lens, N target fingerprint light signals in different directions are transmitted to the N pixel units through the N light guiding passages respectively, and the N target fingerprint light signals are configured to detect fingerprint information of the finger.

Similar to the embodiments above, in the embodiment of the present application, the number N of pixel units in each fingerprint identification unit 401 may be A×A, where $1 < A \leq 4$, and A is a positive integer, preferably, A=2 or 3.

Optionally, in the embodiment of the present application, $A=P_b/P_a$, where $P_b$ is the arrangement period of a plurality of micro-lenses in the fingerprint identification apparatus, and $P_a$ is the arrangement period of a plurality of pixel units in the fingerprint identification apparatus. Considering the image space sampling rate and the process cost comprehensively, in some embodiments, 5 $\mu m \leq P_b \leq 40$ $\mu m$, preferably, 10 $\mu m \leq P_b \leq 30$ $\mu m$.

Specifically, in the embodiment of the present application, if the micro-lens 411 is a spherical lens, the radius of curvature ROC of the micro-lens 411 can be calculated by the following formula:

$$ROC = \frac{CA^2}{8 \times MLH} + \frac{1}{2} \times MLH,$$

where MLH is the height of the micro-lens 411, that is, the height from the vertex of the micro-lens to the lower surface of the micro-lens, and CA is the largest aperture of the micro-lens 411.

Of course, the radius of curvature of the aspheric lens also has its calculation method. For the specific calculation method, please refer to the calculation method in the related technology, which is not specifically discussed herein.

When the target fingerprint light signal in each direction of the target fingerprint light signals of N directions are converged by the micro-lens 411 and then focused on each of the light passing holes in the bottom light shielding layer, the imaging effect is the best and the image contrast is improved while taking into account the image brightness. Therefore, through the technical solution of the embodiment of the present application, a radius of curvature ROC of a constrained micro-lens 411 and a depth distance $Z_1$ between a lower surface of a bottom light shielding layer and a lower surface of a micro-lens 411 satisfy $0.25 \leqslant ROC/Z_1 \leqslant 0.75$, which comprehensively considers the proportional relationship between the focal point of the micro-lens and the location of the bottom light shielding layer, such that the light passing holes of the bottom light shielding layer satisfy or get close to the above condition, to improve the image quality and identification success rate.

In some implementation manners, $0.4 \leqslant ROC/Z_1 \leqslant 0.6$. Preferably, $0.47 \leqslant ROC/Z_1 \leqslant 0.49$, for example: $ROC/Z_1 = 0.47$, 0.48 or 0.49, or $ROC/Z_1$ may also be any value between 0.47 and 0.49, which is not specifically limited in the embodiment of the present application.

Further, in the embodiment of the present application, the location of each light passing hole of the bottom light shielding layer may be further constrained, such that the target fingerprint light signals in N directions are more accurately transmitted to each light passing hole in the bottom light shielding layer, thereby further improving the image quality.

Optionally, a constraint of the light passing holes of the bottom light shielding layer may be: $0 < S_1/Z_1 \leqslant 1$, where $S_1$ is an offset from a center of each light passing hole of the bottom light shielding layer to a center of a projection of the micro-lens on the bottom light shielding layer.

Preferably, in some embodiments, $0.2 \leq S_1/Z_1 \leq 0.5$.

It should be noted herein that, in some other embodiments, the constraint range of $S_1/Z_1$ can also be adjusted, and then the constraint range of $ROC/Z_1$ can be adjusted according to the constraint range of $S_1/Z_1$, so that by adjusting the locations of the light passing holes in the bottom light shielding layer, the angles of required target fingerprint light signals are adjusted, and then the radius of curvature of the micro-lens and the depth distance between the lower surface of the bottom light shielding layer and the lower surface of the micro-lens 411 are adjusted, such that the fingerprint identification apparatus in the embodiment of the present application can receive tilted light signals of various angles while meeting good imaging conditions, which is applicable for a wider range of application scenarios.

Optionally, in the embodiment of the present application, the offsets $S_1$ of the center of each of the light passing holes in the bottom light shielding layer to the center of the projection of the micro-lens 411 on the bottom light shielding layer may be the same or different, and to which the embodiment of the present application is not specifically limited herein.

In both of the application embodiments, the image brightness and contrast requirements are met by constraining the parameters in the fingerprint identification apparatus to meet certain conditions, taking into account the manufacturing process as well as the cost.

Therefore, in the third embodiment, the radius of curvature ROC of the micro-lens 411 and the depth distance $Z_1$ between the lower surface of the bottom light shielding layer and the lower surface of the micro-lens 411 satisfy $0.2 \leqslant ROC/Z_1 \leqslant 0.75$, and the largest aperture $D_1$ of each light passing hole in the bottom light shielding layer and the largest aperture CA of the micro-lens 411 satisfy $0.02 \leqslant D_1/CA \leqslant 0.4$. Combining the two constraints, it can further accurately satisfy the requirements of improving image brightness and contrast requirements optimize the image quality to a greater extent.

On the basis of the fingerprint identification apparatus 400 shown in FIGS. 11 and 12, further, at least one light shielding layer in each fingerprint identification unit 401 may be a plurality of light shielding layers to further achieve a good light guiding effect.

Optionally, in some embodiments, the top light shielding layer in the at least one light shielding layer is provided with a light passing hole, in other words, light passing holes of the plurality of light guiding passages in the top light-blocking layer overlap each other.

In other embodiments, the top light shielding layer in the at least one light shielding layer is also provided with a plurality of light passing holes, by providing the plurality of light passing holes, stray light can be further blocked and so as to prevent the crosstalk of light signals between pixels.

Furthermore, in the at least one light shielding layer, each light shielding layer may be provided with a plurality of light passing holes to form light guiding passages with good light guiding performance.

Optionally, in the embodiment of the present application, at least one light shielding layer in each fingerprint identification unit 401 may be two light shielding layers, which can reduce the cost of the fingerprint identification apparatus while achieving a good light guiding effect.

Figure 13:
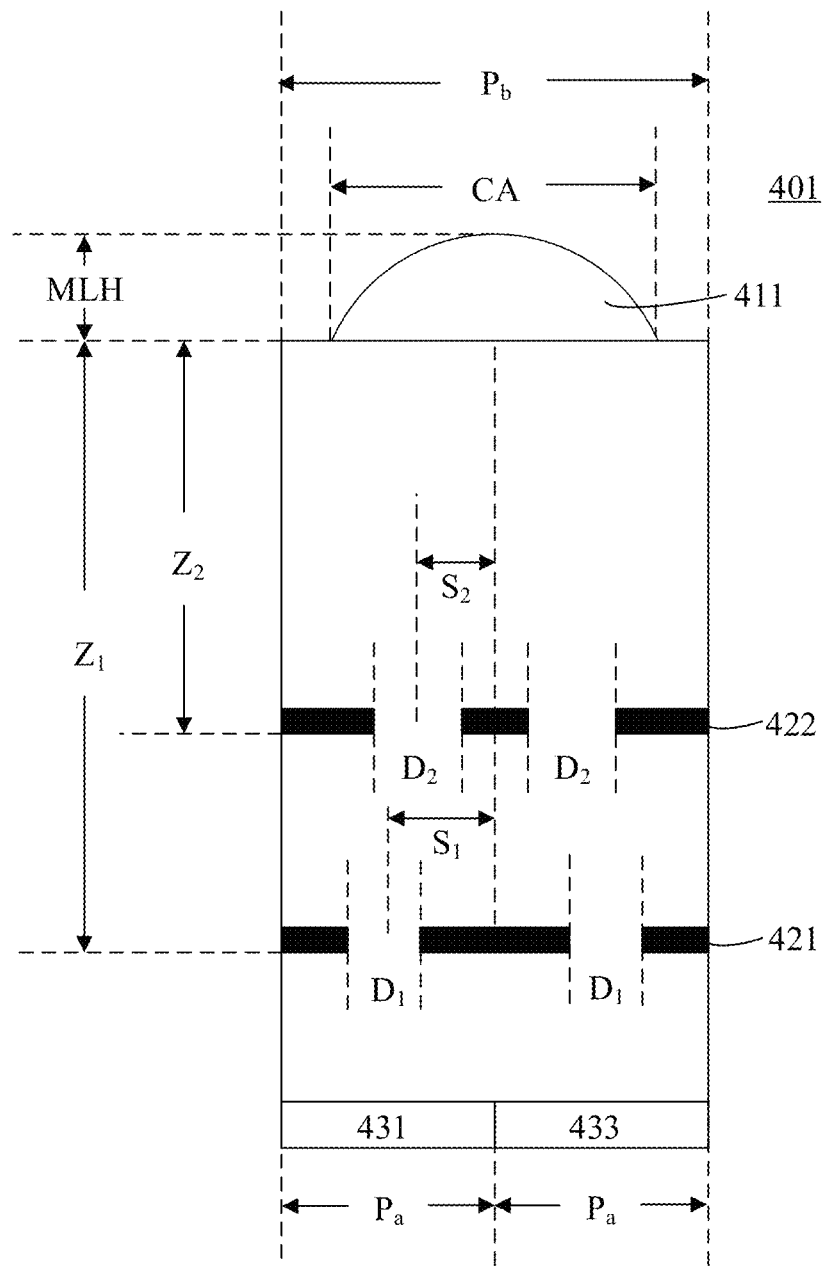
FIGS. 13 and 14 are a schematic cross-sectional view and a schematic top view of another fingerprint identification unit according to an embodiment of the present application.
Figure 14:
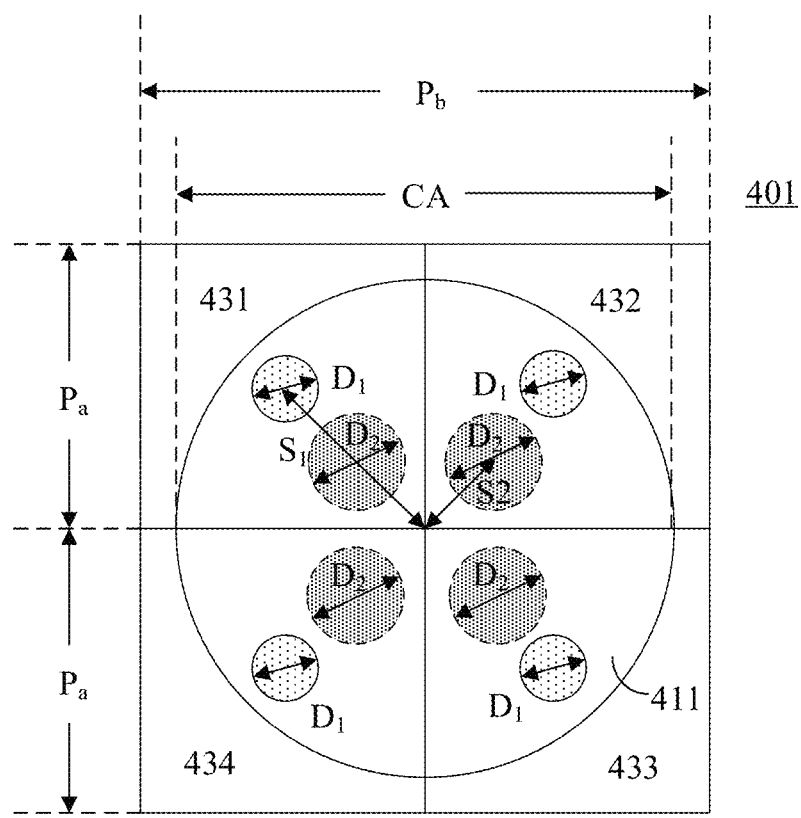

FIGS. 13 and 14 show a schematic cross-sectional view and a schematic top view of another fingerprint identification apparatus 401.

As an example, in FIGS. 13 to 14, the fingerprint identification unit 401 includes a first pixel unit 431, a second pixel unit 432, a third pixel unit 433, and a fourth pixel unit 434, and the holes in at least one light shielding layer form four light passing passages corresponding to the four pixel units. Specifically, in the embodiment of the present application, the first light shielding layer 421 is the bottom light shielding layer, and the second light shielding layer 422 is located above the first light shielding layer 421 and is the top light shielding layer. The first light shielding layer 421 and the second light shielding layer 422 are each provided with four light passing holes to form four light guiding passages in different directions.

Specifically, the fingerprint identification unit 401 may be the fingerprint identification unit 301 in FIGS. 4 to 6, and the design of the light shielding layer and the pixel unit, please refer to the related introduction and description of FIGS. 4 to 6 above, and will not be described herein.

Further, in this application embodiment, if other light shielding layers (e.g., the second light shielding layer 422 in FIGS. 13 and 14) in addition to the bottom light shielding layer are also provided with a plurality of light passing holes, the location of the plurality of light passing holes in the other light shielding layers can be constrained to further optimize the light guiding performance of the light guiding passage, that is, to allow light signals in the target direction to pass while blocking light signals in the non-target direction.

Optionally, the locations of the light passing holes in other light shielding layers can also be constrained as: $0 \leq S_i/Z_1 \leq 1$, preferably, in some embodiments, $0.2 \leq S_i/Z_1 \leq 0.5$, where, $S_i$ represents the offset between each light passing hole in the $i^{th}$ light shielding layer of the fingerprint identification unit and the center of the projection of the micro-lens on the $i^{th}$ light shielding layer. Similarly, the diameter of each light passing hole in the $i^{th}$ light shielding layer in the fingerprint identification unit can be denoted as $D_1$, and the depth distance between the lower surface of the $i^{th}$ light shielding layer and the lower surface of the micro-lens can be denoted as $Z_i$. As an example, in FIGS. 13 and 14, the offset between each light passing hole in the second light shielding layer 422 and the center of the projection of the micro-lens on the second light shielding layer 422 is denoted as $S_2$, and the diameter of each light passing hole in the second light shielding layer 422 is denoted as $D_2$, and the depth distance from the lower surface of the second light shielding layer 422 to the lower surface of the micro-lens may be denoted as $Z_2$.

It should be understood that the offset $S_i$ between the center of each light passing hole in the $i^{th}$ light shielding layer and the center of the projection of the micro-lens on the $i^{th}$ light shielding layer may be the same or different, and to which the embodiment of the present application is not specifically limited herein.

Figure 15:
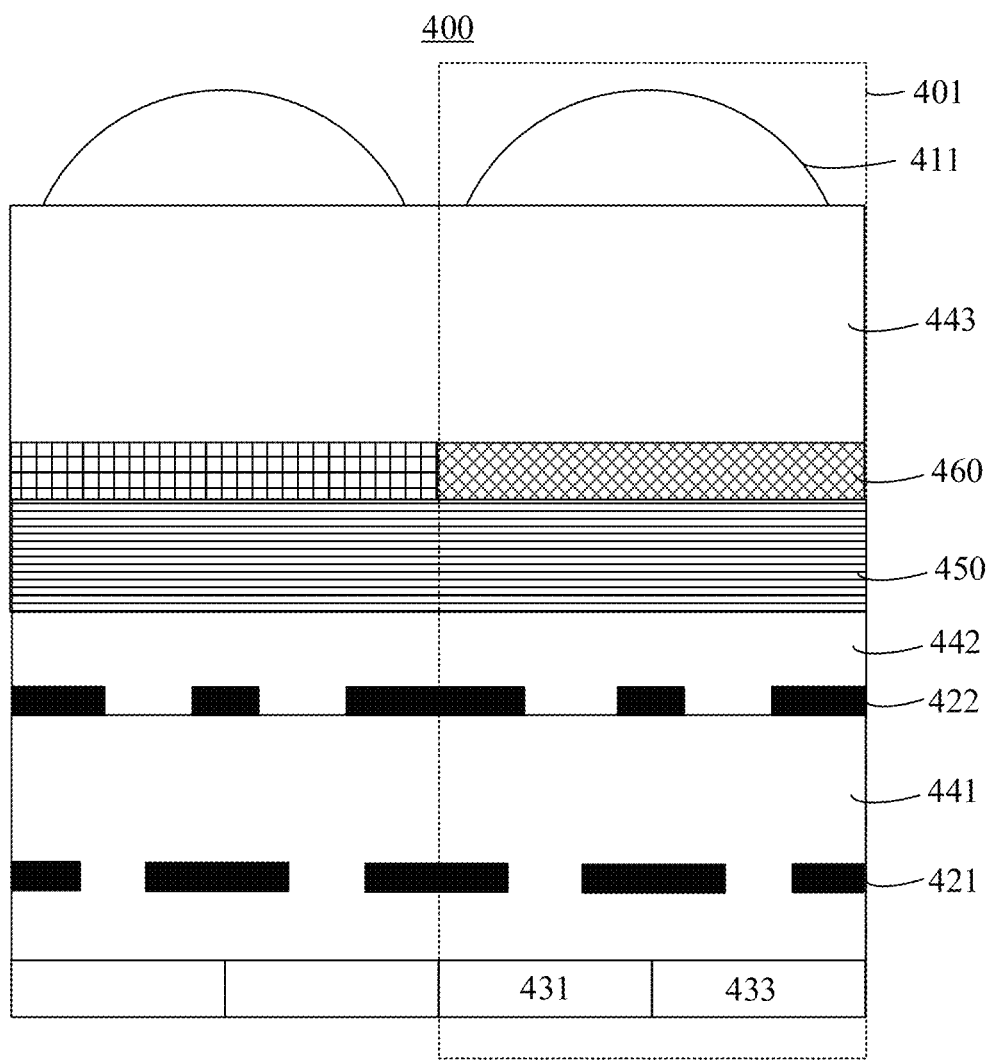
FIG. 15 is a schematic cross-sectional view of another fingerprint identification apparatus and a fingerprint identification unit thereof according to an embodiment of the present application.

Based on the embodiments of FIGS. 13 and 14, FIG. 15 shows a schematic cross-sectional view of another fingerprint identification apparatus 400 and its fingerprint identification unit 401.

As shown in FIG. 15, in the fingerprint identification unit 401, in addition to the micro-lens 411 and its corresponding 4 pixel units, the first light shielding layer 421 and the second light shielding layer 422, it also includes a protective layer 441, where the protective layer 441 is located above the first light shielding layer 421.

Optionally, in the embodiment of the present application, the first light shielding layer 421 and the pixel units are integrated in the sensor chip, and the first light shielding layer 421 may be a metal circuit layer in the sensor chip, or the first light shielding layer 421 may also be other material layer with low visible light transmittance.

The above protective layer 441 may also be a laminated structure in the sensor chip, which is formed on the surface of the sensor chip, and is used to protect the sensor chip from contamination by external water vapor and samples, and to prevent sensor performance failure. Optionally, the protective layer 441 includes, but is not limited to silicon oxide and/or silicon nitride.

It can be understood that the protective layer 441 is also a transparent material layer and has high transmittance for light signals. By setting the height of the protective layer 411, a certain focus distance can be provided for the pixel unit in the sensor chip.

As shown in FIG. 15, the second light shielding layer 422 is disposed on the upper surface of the sensor chip, that is, on the upper surface of the protective layer 441. This arrangement can reduce the distance between the first light shielding layer 421 and the second light shielding layer 422, and improve the light guiding performance of the light guiding passage formed in the two light shielding layers.

In specific implementation, the second light shielding layer may be a black polymer light-absorbing material to absorb most of the light signals in the environment.

Further, the fingerprint identification unit 401 further includes: a second transparent medium layer 442 disposed above the second light shielding layer 422 and filling the light passing holes in the second light shielding layer 422. The second transparent medium layer 442 is also a medium layer formed of a material with high optical transmittance.

Optionally, the second transparent medium layer 442 can be formed on the second light shielding layer 422 by a semiconductor spin coating process and a curing process and filling the light passing holes in the second light shielding layer 422. By setting the height of the transparent medium layer 442, a certain focus distance can also be provide for the pixel unit in the sensor chip.

With continued reference to FIG. 15, the fingerprint identification unit 401 further includes: an infrared filter layer 450 for cutting out infrared light and part of the red light, and preventing the infrared light and part of the red light from entering the pixel unit and affecting the imaging effect.

For example, in the case of strong light, the infrared light in the environment is strong. If the strong infrared light enters the pixel unit, it is easy to cause the signal saturation of the pixel unit. In addition, the infrared light easily penetrates the finger to form the transmitted light of the finger. This part of the transmitted light will affect the imaging of the reflected light from the finger in the normal fingerprint identification process. Combining the above two reasons, infrared light has a greater impact on fingerprint imaging, and it needs to be cut out by an infrared filter layer.

In some embodiments, the infrared filter layer 450 includes a plurality of inorganic material layers. The plurality of inorganic material layers can be formed by coating the second transparent medium layer 442 with a coating process. The coating process includes, but is not limited to, a physical vapor deposition (PVD) coating method. The plurality of inorganic material layers can be a plurality of inorganic material layers of titanium dioxide/silicon dioxide ($TiO_2/SiO_2$) alternately grown, or a niobium pentoxide/silicon dioxide ($Nb_2O_5/SiO_2$) layer alternately grown multiple inorganic material layers, or other organic or inorganic materials used to cut out infrared light signals, which are not limited in the embodiments of the present application.

As shown in FIG. 15, the fingerprint identification unit 401 further includes a color filter layer 460, which is disposed above the infrared filter layer 450, and is used to pass the light signal of the target wavelength band and cut out the light signals of non-target wavelength bands other than the color light signal of the wavelength band, the color filter layer can be realized by a semiconductor photolithography process.

Optionally, the color filter layer includes, but is not limited to, a red filter layer, a blue filter layer, a green filter layer, or a white filter layer for transmitting red light signals, blue light signals, green light signals or white light signal.

On the one hand, if the color filter layer is a multicolor filter layer and transmits multicolor light signals, the pixel units in the fingerprint identification unit 401 receive the multicolor light signals, which can be used to perform fingerprint anti-counterfeiting to determine whether a finger is genuine or fake. If the color filter layer is a white filter layer and transmits a white light signal, the pixel unit in the fingerprint identification unit 401 receives the white light signal, which can be used for fingerprint image generation for fingerprint identification. Therefore, the fingerprint identification apparatus provided in the embodiment of the present application can further perform fingerprint anti-counterfeiting judgment on the basis of fingerprint identification, and improve the success rate of fingerprint identification.

On the other hand, the color filter layer can be used to absorb the light signal reflected by the infrared filter layer below it, to prevent the reflected light signal from being received by the human eye through the display screen, thereby solving the appearance problem of the fingerprint identification apparatus under the screen.

It can be understood that if the color filter layer is a white filter layer, the color filter layer herein can be a transparent medium layer or other filter materials that transmit visible light. The structure of the color filter layer is not specifically limited in the embodiments of the present application.

With continued reference to FIG. 15, above the color filter layer 460, the fingerprint identification unit 401 further includes a third transparent medium layer 443, and the third transparent medium layer 443 is disposed between the micro-lens 411 and the color filter layer 460.

Optionally, the second transparent medium layer 442 can be formed on the second light shielding layer 422 by a semiconductor spin coating process and a curing process and filling the light passing holes in the second light shielding layer 422. The height of the transparent medium layer 442 can be set also provide a certain focus distance for the pixel unit in the sensor chip.

The uppermost layer of the fingerprint identification unit 401 is the micro-lens 411, whose material is generally an optically transparent organic material, such as resin. The size and shape of the micro-lens 411 can be designed through a semiconductor photolithography process and formed by a thermal reflow process. The micro-lens 411 may be a spherical micro lens or an aspheric micro lens.

Figure 16:
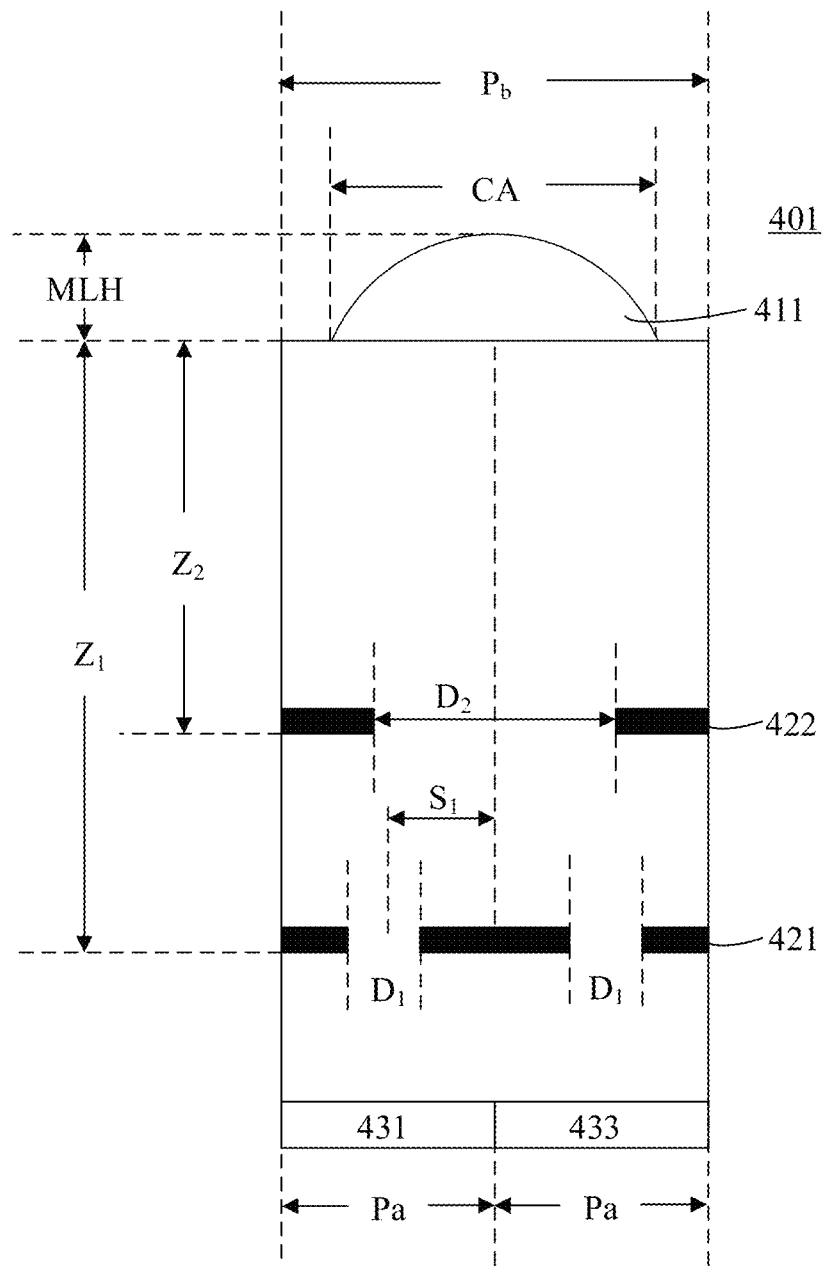
FIGS. 16 and 17 are a schematic cross-sectional view and a schematic top view of another fingerprint identification apparatus and a fingerprint identification unit thereof according to an embodiment of the present application.
Figure 17:
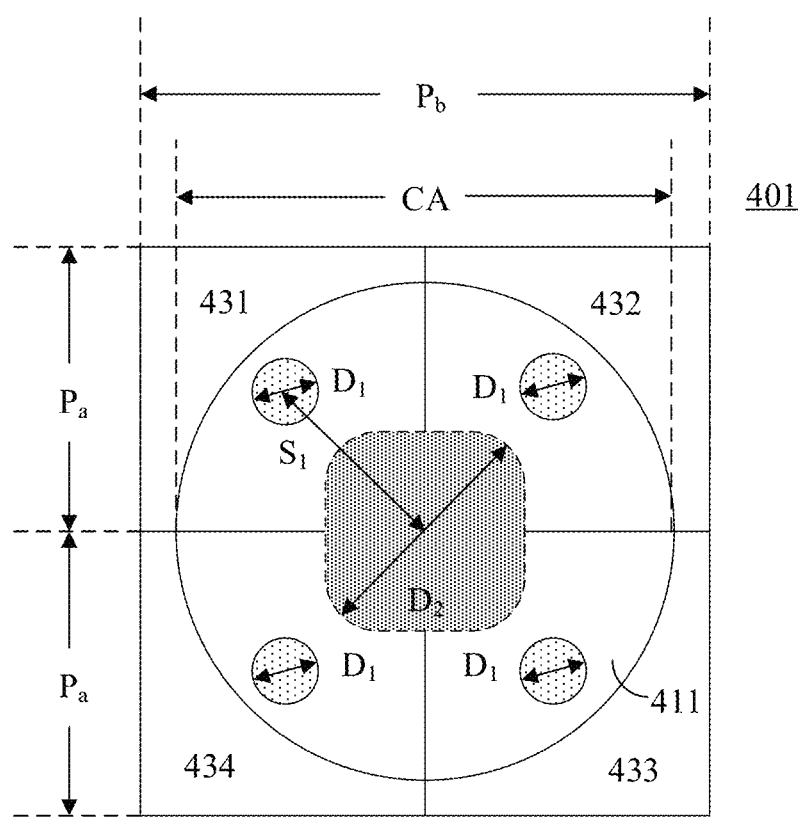

FIGS. 16 and 17 show a schematic cross-sectional view and a schematic top view of another fingerprint identification apparatus 401.

Optionally, in the embodiment of the present application, the fingerprint identification unit 401 may be the fingerprint identification unit 301 in FIGS. 7 to 9, and the design of the light shielding layer and the pixel unit, please refer to the related introduction and description of FIGS. 7 to 9 above, and will not be described herein.

In the embodiment of the present application, in addition to the bottom light shielding layer, if one light passing hole is provided on the top light shielding layer (for example, the second light shielding layer 422 in FIG. 16 and FIG. 17), using this embodiment, the process requirements can be reduced while ensuring the light guide performance, thereby improving the production yield and reducing the production cost.

Optionally, as shown in FIG. 17, the light passing hole provided in the second light shielding layer 422 is a rounded rectangular aperture, or the light passing hole provided in the second light shielding layer 422 can also be a round aperture.

By providing a rounded rectangular aperture on the second light shielding layer 422, compared with a round aperture, the light leakage of the rounded rectangular aperture in the non-rounded area can be reduced, and the stray light in the non-target direction can be reduced through the second blocking layer. The optical layer 422 absorbs stray light while ensuring the passage of sufficient light signals, thereby further improving the light guiding performance of the light guiding passage.

In the implementation of the present application, the center of the light passing hole in the second light shielding layer 422 overlaps with the center of the projection of the micro-lens 411 on the second light shielding layer 422. In other words, the offset between the center of the light passing hole of the second light shielding layer 422 and the center of the micro-lens 411 projected on the second light shielding layer 422 is 0. In the embodiment of the present application, $S_2/Z_1=0$, and $S_2$ is the offset between the light passing hole of the second light blocking 422 and the center of the projection of the micro-lens on the second light shielding layer 422.

Figure 18:
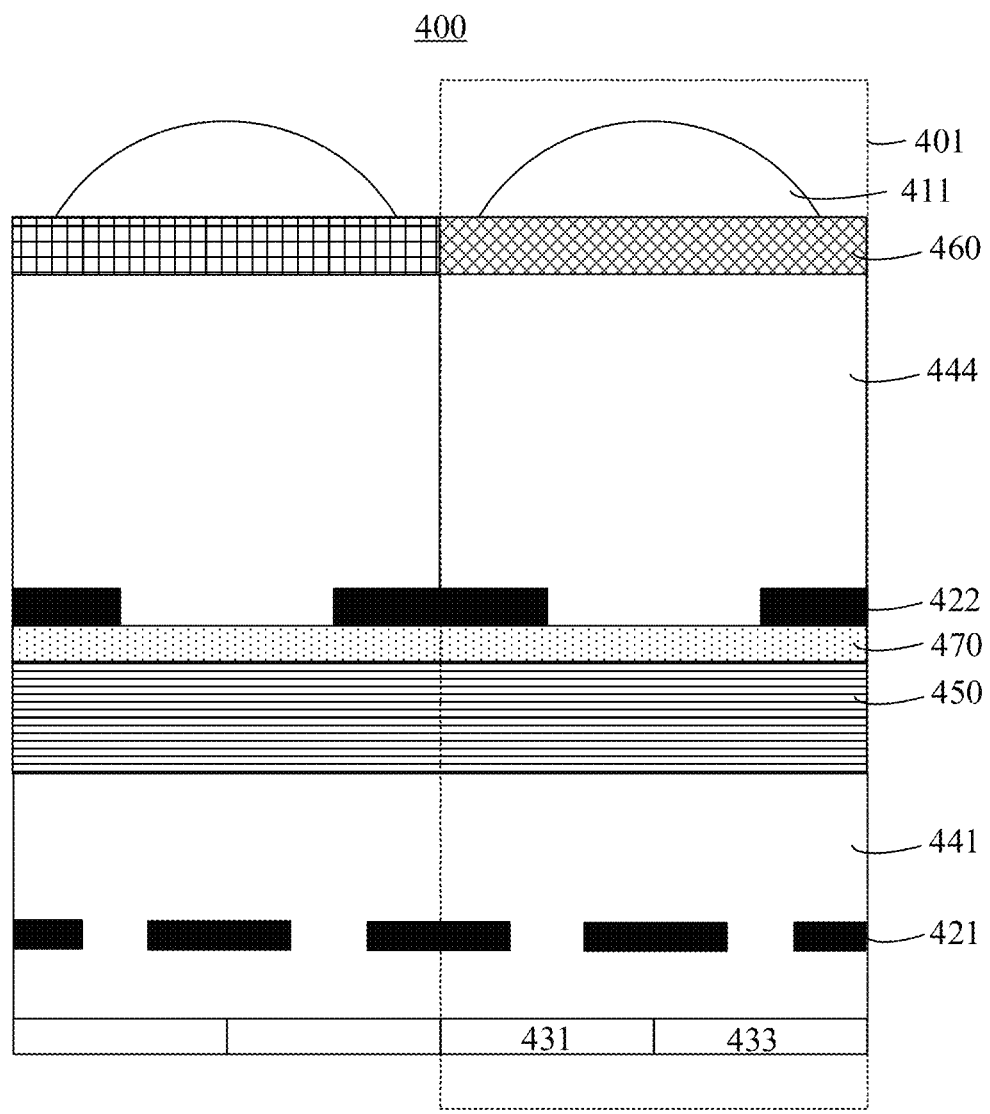
FIG. 18 is a schematic cross-sectional view of another fingerprint identification apparatus and a fingerprint identification unit thereof according to an embodiment of the present application.

FIG. 18 shows a schematic cross-sectional view of another fingerprint identification apparatus 400 and its fingerprint identification unit 401.

As shown in FIG. 18, in the fingerprint identification unit 401, in addition to the micro-lens 411 and its corresponding four pixel units, the first light shielding layer 421 and the second light shielding layer 422, it also includes a protective layer 441, and the protective layer 441 is located above the first light shielding layer 421.

Optionally, as shown in FIG. 18, the fingerprint identification unit 401 further includes an infrared filter layer 450, which is formed on the surface of the protective layer 441 and is used to cut out infrared light signals.

Further, above the infrared filter layer 450, the fingerprint identification unit 401 further includes an adhesive layer 470 for connecting the second light shielding layer 422 and the infrared filter layer 450.

Optionally, the adhesion layer 470 may be an optically high-transmittance organic material layer coated on the infrared filter layer 450, which may be realized by a semiconductor spin coating process and a curing process. The adhesion layer 470 may be a flat transparent layer with a flat surface to prevent the warpage of the infrared filter layer 450 formed by the plurality of organic material layers from affecting the flatness of the second light shielding layer 422, thereby preventing the imaging effect from being affected.

With continued reference to FIG. 18, a first transparent medium layer 444 is also formed above the second light shielding layer 422. The first transparent medium layer 444 may be formed on the second light shielding layer 422 through a semiconductor spin coating process and a curing process and filling the light passing holes in the second light shielding layer 422, which can provide a certain focus distance for the pixel units in the sensor chip by setting the height of the first transparent medium layer 444.

Optionally, the fingerprint identification unit 401 further includes a color filter layer 460, which is disposed above the first transparent medium layer 444 and connects the first transparent medium layer 444 and the micro-lens 411. The color filter layer 460 is used to pass the light signal of the target wavelength band and cut out the light signals of other non-target wavelength bands other than the color light signal of the target wavelength band. Similarly, the color filter layer includes, but is not limited to, a red filter layer, a blue filter layer, a green filter layer, or a white filter layer for transmitting red light signals, blue light signals, green light signals or white light signal.

Specifically, the related technical solutions of the protective layer 441, the first light shielding layer 421, the second light shielding layer 422, the infrared filter layer 450, and the color filter layer 460 in the embodiment of the present application, please refer to related descriptions in FIG. 15, and will not be described herein.

The structure of the various fingerprint identification apparatuses proposed in the present application and the constraints of the parameters are described above. The following Table 1 and Table 2 show the values of the parameters and the constraints of the fingerprint identification apparatuses of several specific embodiments. Here, the unit of each parameter in Table 1 is micrometer (μm), and the unit of parameter $P_b$ in Table 2 is μm.

TABLE 1

| Embodiments | Category 1 | | Category 2 | | | | |
|---|---|---|---|---|---|---|---|
| | Embodiment 1 | Embodiment 2 | Embodiment 3 | Embodiment 4 | Embodiment 5 | Embodiment 6 | Embodiment 7 |
| $P_a$ (μm) | 10.50 | 14.00 | 11.50 | 10.00 | 10.00 | 12.50 | 7.50 |
| $P_b$ (μm) | 21.00 | 28.00 | 23.00 | 20.00 | 20.00 | 25.00 | 15.00 |
| CA (μm) | 16.15 | 21.85 | 18.50 | 19.00 | 19.50 | 23.50 | 14.50 |
| MLH (μm) | 4.20 | 5.80 | 4.80 | 5.00 | 6.10 | 8.90 | 3.00 |
| ROC (μm) | 9.86 | 13.19 | 11.31 | 11.53 | 10.84 | 12.21 | 10.26 |
| $Z_1$ (μm) | 23.30 | 27.57 | 20.93 | 22.64 | 21.91 | 24.06 | 18.23 |
| $S_1$ (μm) | 8.20 | 9.62 | 7.51 | 7.60 | 6.05 | 10.08 | 5.09 |
| $D_1$ (μm) | 2.38 | 2.70 | 2.18 | 2.40 | 2.00 | 2.70 | 1.84 |
| $Z_2$ (μm) | 15.25 | 16.82 | 17.54 | 18.89 | 18.37 | 19.85 | 15.11 |
| $S_2$ (μm) | 0.00 | 0.00 | 5.17 | 5.16 | 4.50 | 7.03 | 3.28 |
| $D_2$ (μm) | 13.30 | 15.88 | 3.48 | 3.84 | 3.28 | 5.18 | 3.20 |

As shown in Table 1, the embodiment 1 and the embodiment 2 in Category 1 may correspond to the fingerprint identification unit 401 and the fingerprint identification apparatus 400 in FIGS. 16 to 18, and the embodiment 3 to embodiment 7 in Category 2 may correspond to the fingerprint identification unit 401 and the fingerprint identification apparatus 400 in FIGS. 13 to 15.

Based on the values of the parameters in Table 1, the following Table 2 exemplarily gives the calculated values of different constraints in various embodiments.

TABLE 2

| Embodiments | Category 1 | | Category 2 | | | | |
|---|---|---|---|---|---|---|---|
| | Embodiment 1 | Embodiment 2 | Embodiment 3 | Embodiment 4 | Embodiment 5 | Embodiment 6 | Embodiment 7 |
| $ROC/Z_1$ | 0.42 | 0.48 | 0.54 | 0.51 | 0.49 | 0.51 | 0.56 |
| $D_1/CA$ | 0.15 | 0.12 | 0.12 | 0.13 | 0.10 | 0.11 | 0.13 |
| $S_1/Z_1$ | 0.35 | 0.37 | 0.36 | 0.34 | 0.28 | 0.42 | 0.28 |
| $S_2/Z_1$ | 0.00 | 0.00 | 0.25 | 0.23 | 0.21 | 0.29 | 0.18 |
| $P_b$ (μm) | 21.00 | 28.00 | 23.00 | 20.00 | 20.00 | 25.00 | 15.00 |
| $P_b/P_a$ | 2.00 | 2.00 | 2.00 | 2.00 | 2.00 | 2.00 | 2.00 |

As shown in Table 2, the constrained values involved in Table 2 can also be used to design the parameters of the fingerprint identification apparatus, and it is not limited to the specific parameters listed in each embodiment in Table 1.

It should be noted that the embodiments of the present application are not limited to the above specific values, and those skilled in the art can determine the specific values of each parameter according to actual optical path design requirements. For example, the above parameters can be accurate to three or four digits after the decimal point.

Figure 19:
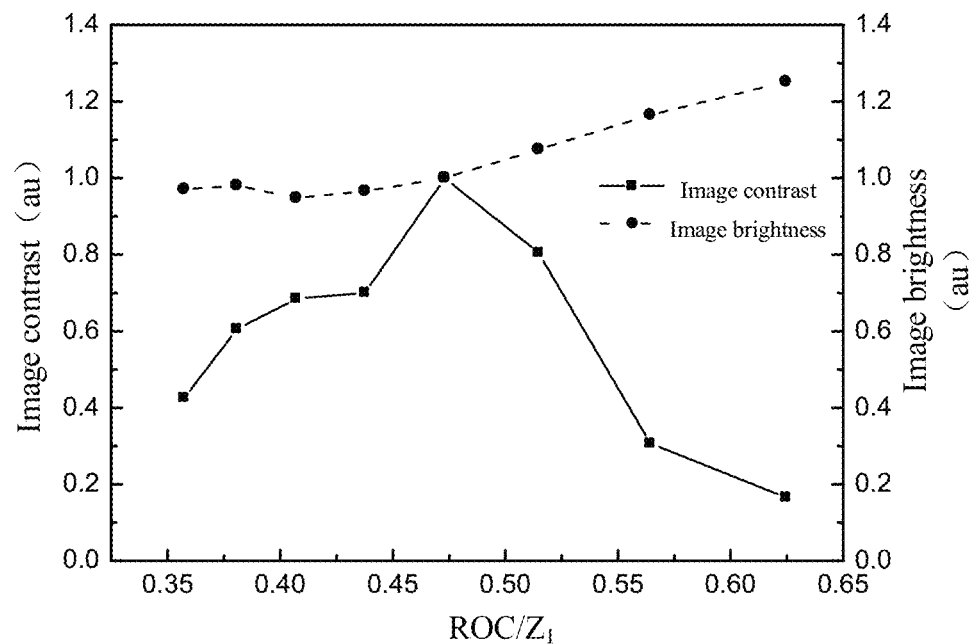
FIG. 19 is a curve graph of the variation of contrast and brightness with $ROC/Z_1$ of an image collected by a fingerprint identification apparatus according to an embodiment of the present application.
Figure 20:
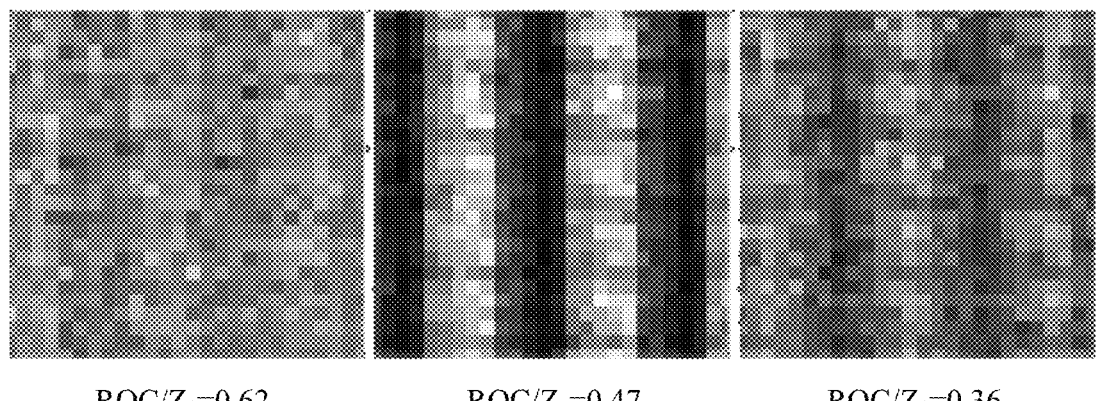
FIG. 20 is a schematic diagram of collected images under three $ROC/Z_1$ constraints according to an embodiment of the present application.

Based on the foregoing embodiment, FIG. 19 shows a curve graph of the variation of contrast and brightness with $ROC/Z_1$ of an image collected by a fingerprint identification apparatus, and FIG. 20 shows a schematic diagram of collected images under three $ROC/Z_1$ constraints. It is understandable that the contrast of an image represents the difference in the degree of lightness and darkness in the image.

As shown in FIG. 19, as the $ROC/Z_1$ increases, the image brightness increases, but the image contrast first increases and then decreases. At $ROC/Z_1 \approx 0.47$, the image contrast is the largest. From FIG. 20, it can be seen that when $ROC/Z_1=0.47$, the brightness and contrast of the image are high, and the image imaging effect is the best. If $ROC/Z_1$ is larger or smaller, the image is too bright or too dark, and the contrast of the image is poor, the image imaging effect is poor.

Figure 21:
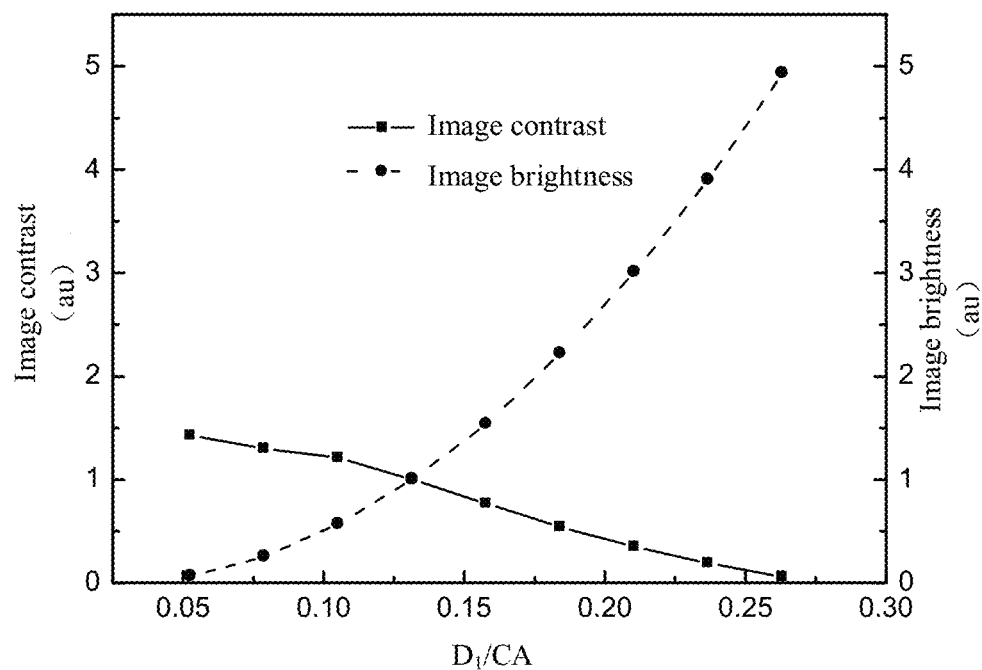
FIG. 21 is a curve graph of the variation of contrast and brightness with $D_1/CA$ of an image collected by a fingerprint identification apparatus according to an embodiment of the present application.
Figure 22:
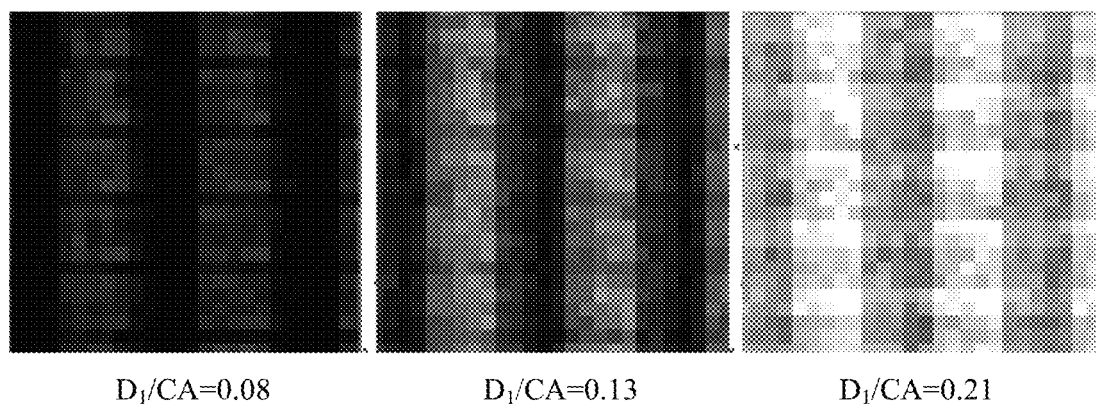
FIG. 22 is a schematic diagram of collected images under three $D_1/CA$ constraints according to an embodiment of the present application.

Similarly, FIG. 21 shows a curve graph of the variation of contrast and brightness with $D_1/CA$ of an image collected by a fingerprint identification apparatus, and FIG. 22 shows a schematic diagram of collected images under three $D_1/CA$ constraints.

As shown in FIG. 21, as the $D_1/CA$ increases, the brightness of the image increases, but the contrast of the image decreases. Considering the brightness and contrast of the image, the value of $D_1/CA$ can be selected between 0.08 and 0.18, preferably, $D_1/CA$ can take a value of 0.13. It can be further seen from FIG. 22 that when $D_1/CA=0.13$, the image imaging effect is the best, and $D_1/CA$ is larger or smaller, and the image imaging effect is poor.

It should be noted herein that the foregoing FIGS. 19 to 22 are merely exemplary descriptions, and should not limit the implementation solutions of the present application.

The preferred embodiments of the present application are described in detail above with reference to the accompanying drawings. However, the present application is not limited to specific details in the foregoing embodiments. Within the technical concept of the present application, a variety of simple variants may be carried out with the technical solutions of the present application, and all of the simple variants are within the protection scope of the present application.

For example, various specific technical features described in the foregoing specific embodiments may be combined in any suitable manner under the condition of no contradiction. In order to avoid unnecessary repetition, various possible combination manners will not be separately described in the present application.

For another example, various different implementation manners of the present application may also be combined arbitrarily, as long as they do not violate the idea of the present application, they should also be regarded as the content disclosed in the present application.

It should be understood that sequence numbers of the processes do not mean execution sequences in various method embodiments of the present application. The execution sequences of the processes should be determined based on functions and internal logic of the processes, and should not be construed as any limitation on the implementation processes of the embodiments of the present application.

An embodiment of the present application is also provided with an electronic device, which may include a display screen and the fingerprint identification apparatus of the above embodiments of the present application, where the fingerprint identification apparatus is disposed under the display screen, to implement under-screen optical fingerprint identification.

The electronic device may be an electronic device with a display screen. For example, the electronic device may be the electronic device 10 shown in FIG. 1.

The display screen described above may be adopted, such as an OLED display screen or other display screens. Related descriptions of the display screen may refer to the description of the display screen in the foregoing description. For brevity, details are not described herein again.

It should be appreciated that specific examples in embodiments of the present application are just for helping those skilled in the art better understand the embodiments of the present application, rather than for limiting the scope of the present application.

It should also be appreciated that terms used in embodiments of the present application and the claims appended hereto are merely for the purpose of describing particular embodiments, and are not intended to limit the embodiments of the present application. For example, the use of a singular form of "a", "the" and "said" in the embodiments of the present application and the claims appended hereto are also intended to include a plural form, unless otherwise clearly indicated herein by context.

Those of ordinary skill in the art may be aware that, units of the examples described in the embodiments disclosed in this paper may be implemented by electronic hardware, computer software, or a combination of the two. To clearly illustrate interchangeability between the hardware and the software, the foregoing illustration has generally described compositions and steps of the examples according to functions. Whether these functions are executed in hardware or software mode depends on a particular application and a design constrain condition of the technical solutions. Those skilled in the art may use different methods to implement the described functions for each particular application, but it should not be considered that the implementation goes beyond the scope of the present application.

In the several embodiments provided in the present application, it should be understood that, the disclosed system and apparatus may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual coupling or direct coupling or communication connection may be indirect coupling or communication connection through some interfaces, apparatuses or units, and may also be electronic, mechanical, or connection in other forms.

The units described as separate parts may or may not be physically separate, and parts displayed as units may or may not be physical units, may be located in one location, or may be distributed on multiple network units. Part of or all of the units here may be selected according to a practical need to achieve the objectives of the solutions of the embodiments of the present application.

In addition, various functional units in the embodiments of the present application may be integrated into a processing unit, or each unit may exist alone physically, or two or more than two units may be integrated into one unit. The integrated unit may be implemented in a form of hardware, or may be implemented in a form of a software functional unit.

If the integrated unit is implemented in the form of the software functional unit and is sold or used as an independent product, it may be stored in a computer readable storage medium. Based on such understanding, the nature of the technical solutions of the present application, or the part contributing to the prior art, or all of or part of the technical solutions may be implemented in a form of software product. The computer software product is stored in a storage medium and includes several instructions for instructing a computer device (which may be a personal computer, a server, or a network device, and the like) to execute all of or part of the steps of the method described in the embodiments of the present application. The preceding storage mediums includes various mediums that can store program codes, such as, a U disk, a removable hard disk, a read-only memory (ROM), a random access memory (RAM), a magnetic disk, an optical disk, or the like.

The foregoing descriptions are merely specific implementations of the present disclosure. The protection scope of the present application, however, is not limited thereto. Various equivalent modifications or replacements may be readily conceivable to any person skilled in the art within the technical scope disclosed in the present application, and such modifications or replacements shall fall within the protection scope of the present application. Therefore, the protection scope of the present application shall be subject to the protection scope of the claim.

What is claimed is:

1. A fingerprint identification apparatus, applicable to be under a display screen to implement under-screen optical fingerprint identification, the fingerprint identification apparatus comprising a plurality of fingerprint identification units arranged in an array, and each fingerprint identification unit of the plurality of fingerprint identification units comprising:
a micro-lens;
at least one light shielding layer, each light shielding layer of the at least one light shielding layer provided with light passing holes, and a bottom light shielding layer of the at least one light shielding layer provided with N light passing holes, wherein a largest aperture $D_1$ of each light passing hole of the bottom light shielding layer and a largest aperture CA of the micro-lens satisfy $0.02 \leq D_1/CA \leq 0.4$, to form N light guiding passages in different directions, and N is a positive integer greater than 1; and a location of each light passing hole of the bottom light shielding layer satisfies $0 < S_1/Z_1 \leqslant 1$, wherein $S_1$ is a distance from a center of each light passing hole of the bottom light shielding layer to a center of a projection of the micro-lens on the bottom light shielding layer, and $Z_1$ is a depth distance between a lower surface of the bottom light shielding layer and a lower surface of the micro-lens;

N pixel units, disposed under the at least one light shielding layer, and the N pixel units disposed at bottom of the N light guiding passages in one-to-one correspondence;

wherein after fingerprint light signals reflected or scattered by a finger above the display screen are converged by the micro-lens, N target fingerprint light signals in different directions are transmitted to the N pixel units through the N light guiding passages respectively, and the N target fingerprint light signals are configured to detect fingerprint information of the finger for fingerprint identification.

2. The fingerprint identification apparatus according to claim 1, wherein the largest aperture $D_1$ of each light passing hole of the bottom light shielding layer and the largest aperture CA of the micro-lens satisfy $0.08 \leqslant D_1/CA \leqslant 0.18$.

3. The fingerprint identification apparatus according to claim 2, wherein the largest aperture $D_1$ of each light passing hole of the bottom light shielding layer and the largest aperture CA of the micro-lens satisfy $0.12 \leqslant D_1/CA \leqslant 0.14$.

4. The fingerprint identification apparatus according to claim 1, wherein a radius of curvature ROC of the micro-lens and a depth distance $Z_1$ between the lower surface of the bottom light shielding layer and the lower surface of the micro-lens satisfy $0.25 \leqslant ROC/Z_1 \leqslant 0.75$.

5. The fingerprint identification apparatus according to claim 4, wherein the radius of curvature ROC of the micro-lens and the depth distance $Z_1$ between the lower surface of the bottom light shielding layer and the lower surface of the micro-lens satisfy $0.4 \leqslant ROC/Z_1 \leqslant 0.6$.

6. The fingerprint identification apparatus according to claim 5, wherein the radius of curvature ROC of the micro-lens and the depth distance $Z_1$ between the lower surface of the bottom light shielding layer and the lower surface of the micro-lens satisfy $0.47 \leqslant ROC/Z_1 \leqslant 0.49$.

7. The fingerprint identification apparatus according to claim 1, the location of each light passing hole of the bottom light shielding layer satisfies $0.2 \leqslant S_1/Z_1 \leqslant 0.5$.

8. The fingerprint identification apparatus according to claim 1, wherein the at least one light shielding layer is a plurality of light shielding layers, in addition to the bottom light-blocking layer of the plurality of light shielding layers, a location of each light passing hole of an $i^{th}$ light shielding layer satisfies $0 \leqslant S_i/Z_1 \leqslant 1$, wherein $S_i$ is a distance from a center of each light passing hole of the $i^{th}$ light shielding layer to a center of a projection of the micro-lens on the $i^{th}$ light shielding layer.

9. The fingerprint identification apparatus according to claim 8, wherein the location of each light passing hole of the $i^{th}$ light shielding layer satisfies $0.25 \leqslant S_i/Z_1 \leqslant 0.5$.

10. The fingerprint identification apparatus according to claim 1, wherein an arrangement period $P_b$ of micro-lenses of the fingerprint identification apparatus and an arrangement period $P_a$ of pixel units of the fingerprint identification apparatus satisfy $1 < P_b/P_a \leqslant 4$.

11. The fingerprint identification apparatus according to claim 10, wherein $P_b/P_a = 2$, and $N = 4$.

12. The fingerprint identification apparatus according to claim 10, wherein the arrangement period $P_b$ of micro-lenses of the fingerprint identification apparatus satisfies $5 \mu m \leqslant P_b \leqslant 40 \mu m$.

13. The fingerprint identification apparatus according to claim 12, wherein the arrangement period $P_b$ of micro-lenses of the fingerprint identification apparatus satisfies $10 \mu m \leqslant P_b \leqslant 30 \mu m$.

14. The fingerprint identification apparatus according to claim 1, wherein the fingerprint identification unit further comprises: a protective layer,
the protective layer disposed on the bottom light shielding layer, and the protective layer, the bottom light shielding layer and the N pixel units integrated together in a sensor chip;
a light passing hole of the at least one light shielding layer is a round light passing hole or a rounded rectangular aperture, and the micro-lens is a spherical lens or an aspheric lens.

15. The fingerprint identification apparatus according to claim 14, wherein the at least one light shielding layer is two light shielding layers, a top light shielding layer of the two light shielding layers is provided with a light passing hole, and light passing holes of the plurality of light guiding passages in the top light-blocking layer overlap each other.

16. The fingerprint identification apparatus according to claim 15, wherein the fingerprint identification unit further comprises: an infrared filter layer, the infrared filter layer is a filter layer coated and grown on a surface of the sensor chip, and the infrared filter layer is configured to cut out infrared light;
an adhesive layer, the adhesive layer is a flat transparent layer coated on a surface of the infrared filter layer, and the top light shielding layer is disposed on the adhesive layer;
a first transparent medium layer, disposed on the top light shielding layer and filling the light passing hole of the top light shielding layer;
a color filter layer, disposed between the micro-lens and the first transparent medium layer, and the color filter layer comprising a red filter layer, a blue filter layer, a green filter layer or a white filter layer.

17. The fingerprint identification apparatus according to claim 14, wherein the at least one light shielding layer is two light shielding layers, and a top light shielding layer of the two light shielding layers is provided with N light passing holes in one-to-one correspondence with the N pixel units.

18. The fingerprint identification apparatus according to claim 17, wherein the top light shielding layer is disposed on an upper surface of the protective layer;
the fingerprint identification unit further comprises:
a second transparent medium layer, disposed on the top light shielding layer and filling the light passing holes of the top light shielding layer.
an infrared filter layer, the infrared filter layer is a filter layer coated and grown on a surface of the second transparent medium layer, and the infrared filter layer is configured to cut out infrared light.

19. The fingerprint identification apparatus according to claim 18, wherein the fingerprint identification unit further comprises:
a color filter layer, disposed on the infrared filter layer, and the color filter layer comprising a red filter layer, a blue filter layer, a green filter layer or a white filter layer;
wherein the fingerprint identification unit further comprises:

a third transparent medium layer, disposed between the micro-lens and the color filter layer.

20. An electronic device, comprising:

a display screen; and a fingerprint identification apparatus, the fingerprint identification apparatus being disposed under the display screen, to implement under-screen optical fingerprint identification;

wherein the fingerprint identification apparatus comprises a plurality of fingerprint identification units arranged in an array, and each fingerprint identification unit of the plurality of fingerprint identification units comprises:

a micro-lens;

at least one light shielding layer, each light shielding layer of the at least one light shielding layer provided with light passing holes, and a bottom light shielding layer of the at least one light shielding layer provided with N light passing holes, wherein a largest aperture $D_1$ of each light passing hole of the bottom light shielding layer and a largest aperture CA of the micro-lens satisfy $0.02 \leq D_1/CA \leq 0.4$, to form N light guiding passages in different directions, and N is a positive integer greater than 1; and a location of each light passing hole of the bottom light shielding layer satisfies $0 < S_1/Z_1 \leq 1$, wherein $S_1$ is a distance from a center of each light passing hole of the bottom light shielding layer to a center of a projection of the micro-lens on the bottom light shielding layer, and $Z_1$ is a depth distance between a lower surface of the bottom light shielding layer and a lower surface of the micro-lens;

N pixel units, disposed under the at least one light shielding layer, and the N pixel units disposed at bottom of the N light guiding passages in one-to-one correspondence;

wherein after fingerprint light signals reflected or scattered by a finger above the display screen are converged by the micro-lens, N target fingerprint light signals in different directions are transmitted to the N pixel units through the N light guiding passages respectively, and the N target fingerprint light signals are configured to detect fingerprint information of the finger for fingerprint identification.

* * * * *